(12) United States Patent
Meiri et al.

(10) Patent No.: US 11,435,921 B2
(45) Date of Patent: Sep. 6, 2022

(54) SELECTIVE DEDUPLICATION IN A DISTRIBUTED STORAGE SYSTEM

(71) Applicant: EMC IP Holding Company LLC, Hopkinton, MA (US)

(72) Inventors: David Meiri, Somerville, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/952,639

(22) Filed: Nov. 19, 2020

(65) Prior Publication Data
US 2022/0155986 A1    May 19, 2022

(51) Int. Cl.
  *G06F 3/06* (2006.01)
(52) U.S. Cl.
  CPC .......... *G06F 3/0641* (2013.01); *G06F 3/0613* (2013.01); *G06F 3/0644* (2013.01);
  (Continued)
(58) Field of Classification Search
  CPC .... G06F 3/0641; G06F 3/0613; G06F 3/0644; G06F 3/0656; G06F 3/0659; G06F 3/0665; G06F 3/0689
  See application file for complete search history.

(56) References Cited

U.S. PATENT DOCUMENTS 7,165,155 B1   1/2007 Duprey et al.
7,440,982 B2  10/2008 Lu et al.
(Continued)

FOREIGN PATENT DOCUMENTS

WO       2016111954 A1    7/2016
WO  PCT/US2019/024885    1/2020
(Continued)

OTHER PUBLICATIONS

Chernov, Ilva, et al. "Survey on deduplication techniques in flash-based storage." 2018 22nd Conference of Open Innovations Association (FRUCT). IEEE, 2018. (Year: 2018).*
(Continued)

*Primary Examiner* — Charles Rones
*Assistant Examiner* — Hewy H Li
(74) *Attorney, Agent, or Firm* — Ryan, Mason & Lewis, LLP

(57) ABSTRACT

For each of multiple storage volumes of a distributed storage system, it is determined whether the storage volume has a relatively high potential deduplicability or a relatively low potential deduplicability. Responsive to determining that the storage volume has the relatively high potential deduplicability, a first write flow is executed for each of a plurality of write requests directed to the storage volume, the first write flow utilizing content-based signatures of respective data pages of the storage volume to store the data pages in storage devices of the distributed storage system. Responsive to determining that the storage volume has the relatively low potential deduplicability, a second write flow is executed for each of a plurality of write requests directed to the storage volume, the second write flow utilizing non-content-based signatures of respective data pages of the storage volume to store the data pages in storage devices of the distributed storage system.

20 Claims, 7 Drawing Sheets

(52) U.S. Cl.
CPC .......... *G06F 3/0656* (2013.01); *G06F 3/0659* (2013.01); *G06F 3/0665* (2013.01); *G06F 3/0689* (2013.01)

(56) References Cited

U.S. PATENT DOCUMENTS

| | | | |
|---|---|---|---|
| 7,444,464 B2 | 10/2008 | Urmston et al. | |
| 8,095,726 B1 | 1/2012 | O'Connell et al. | |
| 8,214,612 B1 | 7/2012 | Natanzon | |
| 8,301,593 B2 | 10/2012 | Hoffmann et al. | |
| 8,335,899 B1 | 12/2012 | Meiri et al. | |
| 9,104,326 B2 | 8/2015 | Frank et al. | |
| 9,152,333 B1* | 10/2015 | Johnston | G06F 3/0641 |
| 9,208,162 B1 | 12/2015 | Hallak et al. | |
| 9,286,003 B1 | 3/2016 | Hallak et al. | |
| 9,424,285 B1* | 8/2016 | Condict | G06F 3/0608 |
| 9,514,014 B2 | 12/2016 | Webman et al. | |
| 9,552,258 B2 | 1/2017 | Hallak et al. | |
| 9,606,870 B1 | 3/2017 | Meiri et al. | |
| 9,716,754 B2 | 7/2017 | Swift | |
| 9,891,994 B1 | 2/2018 | Schneider et al. | |
| 10,176,046 B1 | 1/2019 | Hu et al. | |
| 10,248,582 B2* | 4/2019 | Sobolewski | G06F 3/0641 |
| 10,261,693 B1 | 4/2019 | Schneider et al. | |
| 10,324,640 B1 | 6/2019 | Chen et al. | |
| 10,338,851 B1 | 7/2019 | Kronrod et al. | |
| 10,359,965 B1 | 7/2019 | Stronge et al. | |
| 10,394,485 B1 | 8/2019 | Chen et al. | |
| 10,437,501 B1 | 10/2019 | Kucherov et al. | |
| 10,437,855 B1 | 10/2019 | Stronge et al. | |
| 10,466,925 B1 | 11/2019 | Blanco et al. | |
| 10,496,324 B2 | 12/2019 | Meiri et al. | |
| 10,496,489 B1 | 12/2019 | Chen et al. | |
| 10,496,672 B2 | 12/2019 | Meiri et al. | |
| 10,558,613 B1 | 2/2020 | Shveidel et al. | |
| 10,565,165 B2* | 2/2020 | Mallaiah | G06F 3/067 |
| 10,592,159 B2 | 3/2020 | Kucherov et al. | |
| 10,592,161 B1 | 3/2020 | Chen et al. | |
| 10,606,519 B1 | 3/2020 | Shveidel | |
| 10,635,533 B2 | 4/2020 | Schneider et al. | |
| 10,684,915 B2 | 6/2020 | Schneider et al. | |
| 10,691,355 B2 | 6/2020 | Kucherov et al. | |
| 10,691,373 B2 | 6/2020 | Harduf et al. | |
| 10,691,551 B2 | 6/2020 | Meiri et al. | |
| 10,698,772 B2 | 6/2020 | Hu et al. | |
| 10,705,965 B2 | 7/2020 | Shveidel et al. | |
| 10,719,253 B2 | 7/2020 | Alkalay et al. | |
| 10,725,855 B2 | 7/2020 | Shani et al. | |
| 10,754,559 B1 | 8/2020 | Meiri et al. | |
| 10,754,575 B2 | 8/2020 | Stronge | |
| 10,754,736 B2 | 8/2020 | Shani et al. | |
| 10,761,933 B2 | 9/2020 | Moore et al. | |
| 10,783,038 B2 | 9/2020 | Moore et al. | |
| 10,817,385 B2 | 10/2020 | Meiri et al. | |
| 10,824,512 B2 | 11/2020 | Resnik et al. | |
| 10,826,990 B2 | 11/2020 | Kamran et al. | |
| 10,831,407 B2 | 11/2020 | Glimcher et al. | |
| 10,831,735 B2 | 11/2020 | Schneider et al. | |
| 10,838,863 B2 | 11/2020 | Kamran et al. | |
| 2007/0022121 A1 | 1/2007 | Bahar et al. | |
| 2008/0279462 A1 | 11/2008 | Celi, Jr. | |
| 2009/0132955 A1 | 5/2009 | Garg et al. | |
| 2009/0276593 A1 | 11/2009 | Jacobson et al. | |
| 2010/0179941 A1 | 7/2010 | Agrawal et al. | |
| 2011/0022566 A1 | 1/2011 | Beaverson et al. | |
| 2011/0225123 A1 | 9/2011 | D'Souza et al. | |
| 2012/0124282 A1* | 5/2012 | Frank | G06F 3/0641 711/108 |
| 2013/0305002 A1 | 11/2013 | Hallak et al. | |
| 2013/0325824 A1 | 12/2013 | Shoens | |
| 2014/0181016 A1 | 6/2014 | Whitehead et al. | |
| 2014/0244935 A1 | 8/2014 | Ezra et al. | |
| 2014/0304239 A1* | 10/2014 | Lewis | G06F 3/067 707/692 |
| 2014/0359244 A1* | 12/2014 | Chambliss | G06F 3/0604 711/170 |
| 2015/0378766 A1 | 12/2015 | Beveridge et al. | |
| 2015/0378785 A1 | 12/2015 | Tarasuk-Levin et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2016/0261513 A1 | 9/2016 | Aingaran et al. | |
| 2016/0345207 A1 | 11/2016 | Kwak et al. | |
| 2017/0075842 A1 | 3/2017 | Su et al. | |
| 2017/0185529 A1 | 6/2017 | Chhabra et al. | |
| 2017/0192857 A1 | 7/2017 | Meiri et al. | |
| 2018/0095873 A1 | 4/2018 | Nakagoe et al. | |
| 2019/0303490 A1 | 10/2019 | Chen et al. | |
| 2019/0370354 A1 | 12/2019 | Kucherov et al. | |
| 2019/0370355 A1 | 12/2019 | Kucherov et al. | |
| 2019/0370356 A1 | 12/2019 | Kucherov et al. | |
| 2019/0370357 A1 | 12/2019 | Kucherov et al. | |
| 2019/0392060 A1 | 12/2019 | Meiri et al. | |
| 2020/0026616 A1 | 1/2020 | Hu et al. | |
| 2020/0097174 A1 | 3/2020 | Moore et al. | |
| 2020/0097363 A1 | 3/2020 | Moore et al. | |
| 2020/0097393 A1 | 3/2020 | Moore et al. | |
| 2020/0125276 A1 | 4/2020 | Shani et al. | |
| 2020/0218601 A1 | 7/2020 | Schneider et al. | |
| 2020/0218610 A1 | 7/2020 | Schneider et al. | |
| 2020/0225849 A1 | 7/2020 | Meiri et al. | |
| 2020/0226023 A1 | 7/2020 | Meiri | |
| 2020/0226145 A1 | 7/2020 | Meiri | |
| 2020/0233704 A1 | 7/2020 | Alkalay et al. | |
| 2020/0233705 A1 | 7/2020 | Alkalay et al. | |
| 2020/0233881 A1 | 7/2020 | Harduf et al. | |
| 2020/0242130 A1 | 7/2020 | Chen et al. | |
| 2020/0249868 A1 | 8/2020 | Glimcher et al. | |
| 2020/0249869 A1 | 8/2020 | Glimcher et al. | |
| 2020/0250089 A1 | 8/2020 | Kamran et al. | |
| 2020/0250144 A1 | 8/2020 | Natanzon et al. | |
| 2020/0272542 A1 | 8/2020 | Meiri et al. | |
| 2020/0272600 A1 | 8/2020 | Natanzon et al. | |
| 2020/0285268 A1 | 9/2020 | Meiri et al. | |
| 2020/0285402 A1 | 9/2020 | Meiri et al. | |
| 2020/0301784 A1 | 9/2020 | Chen | |
| 2020/0310649 A1 | 10/2020 | Chen et al. | |
| 2020/0310654 A1 | 10/2020 | Meiri et al. | |
| 2020/0326877 A1 | 10/2020 | Chen et al. | |
| 2020/0327024 A1 | 10/2020 | Alkalay et al. | |
| 2020/0341641 A1 | 10/2020 | Kucherov et al. | |
| 2020/0341682 A1 | 10/2020 | Kucherov et al. | |
| 2020/0341749 A1 | 10/2020 | Bashi et al. | |
| 2020/0364106 A1 | 11/2020 | Chen et al. | |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

Zhang, Binqi, et al. "DCDedupe: Selective deduplication and delta compression with effective routing for distributed storage." Journal of Grid Computing 16.2 (2018): 195-209. (Year: 2018).*

Malhotra, Jyoti, and Jagdish Bakal. "A survey and comparative study of data deduplication techniques." 2015 International Conference on Pervasive Computing (ICPC). IEEE, 2015. (Year: 2015).*

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

(56) References Cited

OTHER PUBLICATIONS

Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
U.S. Appl. No. 15/662,708 filed in the name of Xiangping Chen et al. filed Jul. 28, 2017, and entitled "Token-Based Data Flow Control in a Clustered Storage System."
U.S. Appl. No. 15/793,121 filed in the name of David Meiri et al. filed Oct. 25, 2017, and entitled "Opportunistic Compression of Replicated Data in a Content Addressable Storage System."
U.S. Appl. No. 15/824,536 filed in the name of Christopher Sayles et al. filed Nov. 28, 2017, and entitled "Storage System with Asynchronous Messaging between Processing Modules for Data Replication."
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/530,121 filed in the name of Anton Kucherov et al. filed Aug. 2, 2019, and entitled "Memory-Efficient Processing of Raid Metadata Bitmaps."
U.S. Appl. No. 16/663,524 filed in the name of Xiangping Chen et al. filed Oct. 25, 2019, and entitled "Storage System with Throughput-Based Timing of Synchronous Replication Recovery."
U.S. Appl. No. 16/665,651 filed in the name of Lior Kamran et al. filed Oct. 28, 2019, and entitled "Recovery Flow with Reduced Address Lock Contention in a Content Addressable Storage System."
U.S. Appl. No. 16/671,824 filed in the name of Lior Kamran et al. filed Nov. 1, 2019, and entitled "Storage System Capacity Expansion Using Mixed-Capacity Storage Devices."
U.S. Appl. No. 16/693,858 filed in the name of Doron Tal filed Nov. 25, 2019, and entitled "Storage System with Prioritized RAID Rebuild."
U.S. Appl. No. 16/813,960 filed in the name of Alex Soukhman et al. filed Mar. 10, 2020, and entitled "Metadata Update Journal Destaging with Preload Phase for Efficient Metadata Recovery in a Distributed Storage System."
U.S. Appl. No. 16/894,973 filed in the name of Alex Soukhman et al. filed Jun. 8, 2020, and entitled "Dynamic Modification of IO Shaping Mechanisms of Multiple Storage Nodes in a Distributed Storage System".
NVM Express, "NVM Express, Revision 1.3," NVM Express, May 1, 2017, 282 pages.

* cited by examiner

SELECTIVE DEDUPLICATION IN A DISTRIBUTED STORAGE SYSTEM

FIELD

The field relates generally to information processing systems, and more particularly to storage in information processing systems.

BACKGROUND

A wide variety of different types of distributed storage systems are known. Such storage systems include clustered storage systems as well as other types of storage systems that are distributed across multiple storage nodes. Distributed storage systems can include a potentially large number of distributed storage nodes that are interconnected by a mesh network or other type of communication network. Each such storage node of a distributed storage system typically processes input-output (IO) operations from one or more host devices and in processing those IO operations runs various storage application processes that generally involve interaction of that storage node with one or more other ones of the storage nodes.

SUMMARY

Illustrative embodiments provide techniques for selective deduplication in a distributed storage system. For example, selective deduplication in some embodiments distinguishes between storage volumes with relatively low deduplication potential, also referred to herein as "low-dedupe" volumes, and storage volumes with relatively high deduplication potential, also referred to herein as "high-dedupe" volumes. Such embodiments can selectively apply deduplication write flows and other related processes only to those write requests directed to high-dedupe volumes, while using non-deduplication write flows and other related processes for those write requests directed to low-dedupe volumes.

Accordingly, some embodiments disclosed herein advantageously configure a single deduplication-based storage array or other distributed storage system to store non-deduplicated data efficiently while also using deduplication mechanisms of the distributed storage system for storing deduplicated data.

These and other embodiments can provide significant performance advantages in a distributed storage system by providing sequential storage of data pages of low-dedupe volumes while also allowing maximal deduplication for high-dedupe volumes. This overcomes potential performance penalties and other drawbacks of conventional approaches that require deduplication for all storage volumes.

In one embodiment, an apparatus comprises at least one processing device comprising a processor coupled to a memory. The at least one processing device is configured, for each of a plurality of storage volumes of a distributed storage system, to determine whether the storage volume has a relatively high potential deduplicability or a relatively low potential deduplicability. Responsive to determining that the storage volume has the relatively high potential deduplicability, the at least one processing device executes a first write flow in the distributed storage system for each of a plurality of write requests directed to the storage volume, with the first write flow utilizing content-based signatures of respective data pages of the storage volume to store the data pages in storage devices of the distributed storage system. Responsive to determining that the storage volume has the relatively low potential deduplicability, the at least one processing device executes a second write flow in the distributed storage system for each of a plurality of write requests directed to the storage volume, with the second write flow utilizing non-content-based signatures of respective data pages of the storage volume to store the data pages in storage devices of the distributed storage system.

In some embodiments, the distributed storage system comprises a plurality of storage nodes. The storage nodes of the distributed storage system are illustratively interconnected in a mesh network, although other interconnection arrangements may be used. The distributed storage system includes persistent storage illustratively comprising a first plurality of storage devices associated with the first storage node and one or more additional pluralities of storage devices associated with respective additional ones of the storage nodes. The storage devices associated with a given one of the storage nodes are illustratively implemented in a disk array enclosure or other type of storage array enclosure of the given storage node.

Each of at least a subset of the storage nodes of the distributed storage system in some embodiments illustratively comprises a set of processing modules configured to communicate with corresponding sets of processing modules on other ones of the storage nodes, with a given such set of processing modules comprising, for example, at least a routing module, a control module and a data module. The sets of processing modules of the respective storage nodes of the distributed storage system collectively comprise at least a portion of a distributed storage controller of the distributed storage system.

In some embodiments, the first write flow for each of one or more of the write requests directed to the storage volume comprises receiving the write request in one of the routing modules, computing in the routing module a content-based signature for a data page of the write request, selecting in the routing module a particular one of the control modules based at least in part on a logical address of the data page, sending the write request and the content-based signature from the routing module to the selected control module, selecting in the control module a particular one of the data modules based at least in part on the content-based signature, and sending the data page from the control module to the selected data module for storage of the data page based at least in part on the content-based signature.

Additionally or alternatively, the second write flow for each of one or more of the write requests directed to the storage volume comprises receiving the write request in one of the routing modules, selecting in the routing module a particular one of the control modules based at least in part on a logical address of the data page, sending the write request from the routing module to the selected control module, generating in the control module a non-content-based signature for a data page of the write request, selecting in the control module a particular one of the data modules based at least in part on the non-content-based signature, and sending the data page from the control module to the selected data module for storage of the data page based at least in part on the non-content-based signature.

The non-content-based signature in some embodiments is generated for the data page based at least in part on an identifier of the storage volume and an offset of the data page within the storage volume. For example, various combinations of the identifier of the storage volume and a logical address of the data page within the storage volume can be used to generate the non-content-based signature. Such a non-content-based signature uniquely identifies the data page among all other data pages of the distributed storage system, and in some embodiments herein is referred to as an "artificial signature." An artificial signature or other type of non-content-based signature in some embodiments herein is utilized to provide sequential storage for data pages of low-dedupe volumes, in contrast to a content-based signature, such as a hash digest or hash handle, that is generated from data page content and used to provide deduplicated storage for data pages of high-dedupe volumes.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
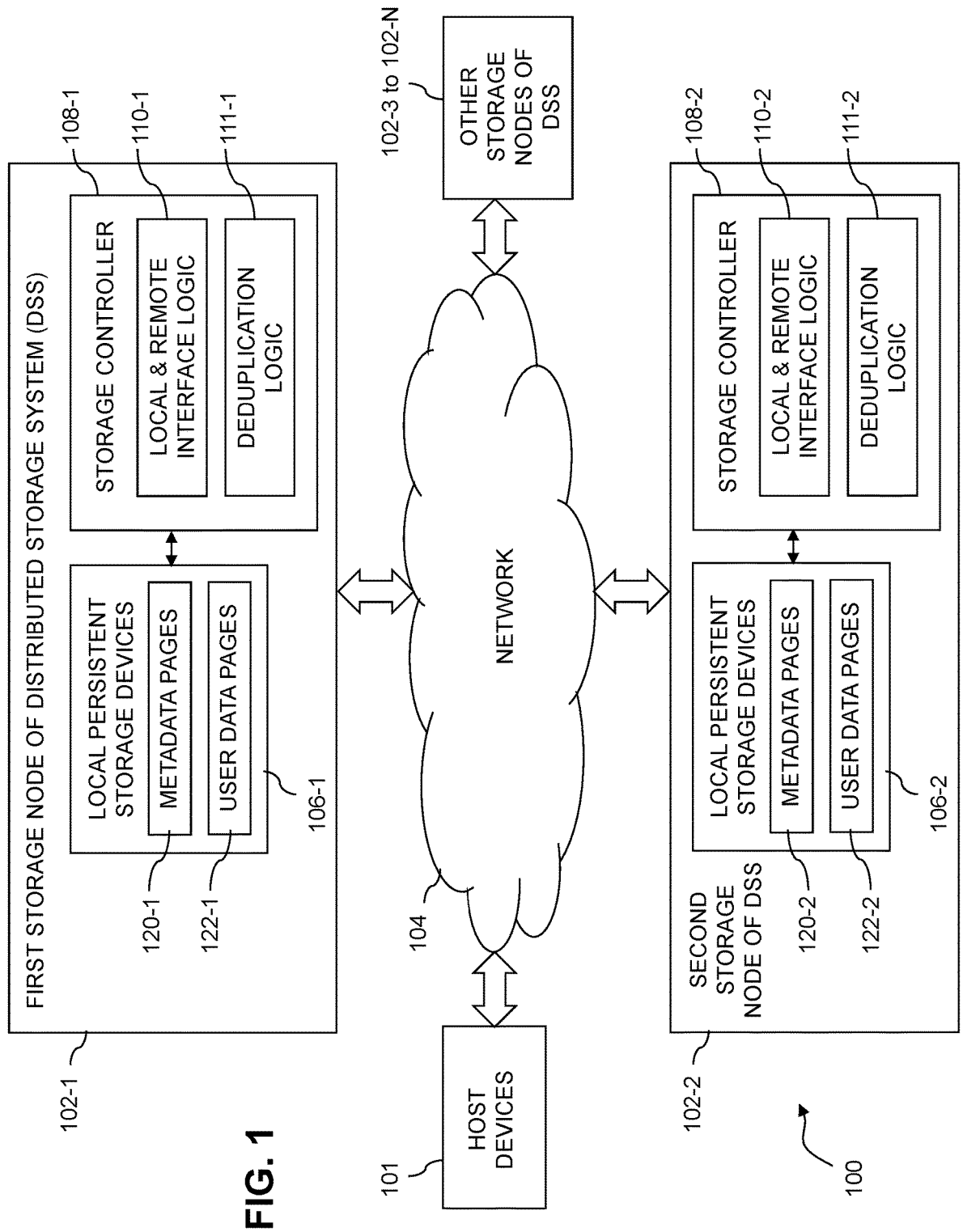
FIG. 1 is a block diagram of an information processing system comprising a distributed storage system incorporating functionality for selective deduplication in an illustrative embodiment.

FIG. 1 shows an information processing system 100 configured in accordance with an illustrative embodiment. The information processing system 100 comprises a plurality of host devices 101, a first storage node 102-1, a second storage node 102-2, and a plurality of additional storage nodes 102-3 through 102-N, all of which are configured to communicate with one another over a network 104. The first and second storage nodes 102 with the additional storage nodes 102-3 through 102-N collectively form an example of what is more generally referred to herein as a "distributed storage system" or DSS. Other distributed storage systems can include different numbers and arrangements of storage nodes. For example, a distributed storage system in some embodiments may include only the first and second storage nodes 102.

Each of the storage nodes 102 is illustratively configured to interact with one or more of the host devices 101. The host devices 101 illustratively comprise servers or other types of computers of an enterprise computer system, cloud-based computer system or other arrangement of multiple compute nodes associated with respective users.

The host devices 101 in some embodiments illustratively provide compute services such as execution of one or more applications on behalf of each of one or more users associated with respective ones of the host devices 101. Such applications illustratively generate input-output (IO) operations that are processed by a corresponding one of the storage nodes 102. The term "input-output" as used herein refers to at least one of input and output. For example, IO operations may comprise write requests and/or read requests directed to logical addresses of a particular logical storage volume of a given one of the storage nodes 102. These and other types of IO operations are also generally referred to herein as IO requests.

The IO operations that are being concurrently processed in the system in some embodiments are referred to herein as "in-flight" IOs that have been admitted by the storage nodes 102 to further processing within the system 100. The storage nodes 102 are illustratively configured to queue IO operations arriving from one or more of the host devices 101 in one or more sets of IO queues.

The storage nodes 102 illustratively comprise respective processing devices of one or more processing platforms. For example, the storage nodes 102 can each comprise one or more processing devices each having a processor and a memory, possibly implementing virtual machines and/or containers, although numerous other configurations are possible.

The storage nodes 102 can additionally or alternatively be part of cloud infrastructure such as an Amazon Web Services (AWS) system. Other examples of cloud-based systems that can be used to provide at least portions of the storage nodes 102 include Google Cloud Platform (GCP) and Microsoft Azure.

The storage nodes 102 may be implemented on a common processing platform, or on separate processing platforms.

The host devices 101 are illustratively configured to write data to and read data from the distributed storage system comprising storage nodes 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The first storage node 102-1 comprises a plurality of storage devices 106-1 and an associated storage controller 108-1. The storage devices 106-1 store metadata pages 120-1 and user data pages 122-1 associated with one or more storage volumes of the distributed storage system. The storage volumes illustratively comprise respective logical units (LUNs) or other types of logical storage volumes. The storage devices 106-1 more particularly comprise local persistent storage devices of the first storage node 102-1. Such persistent storage devices are local to the first storage node 102-1, but remote from the second storage node 102-2 and the other storage nodes 102.

Similarly, the second storage node 102-2 comprises a plurality of storage devices 106-2 and an associated storage controller 108-2. The storage devices 106-2 store metadata pages 120-2 and user data pages 122-2 associated with one or more storage volumes of the distributed storage system, such as the above-noted LUNs. The storage devices 106-2 more particularly comprise local persistent storage devices of the second storage node 102-2. Such persistent storage devices are local to the second storage node 102-2, but remote from the first storage node 102-1 and the other storage nodes 102.

The storage controller 108-1 of first storage node 102-1 in the FIG. 1 embodiment includes local and remote interface logic 110-1 and deduplication logic 111-1. It can also include additional elements, such as journal destaging logic and other logic instances for processing IO operations, and a signature generator for generating content-based signatures of respective data pages.

Similarly, the storage controller 108-2 of second storage node 102-2 includes local and remote interface logic 110-2 and deduplication logic 111-2. The storage controller 108-2, like the storage controller 108-1, can also include additional elements, such as journal destaging logic and other logic instances for processing IO operations, and a signature generator for generating content-based signatures of respective data pages.

The instances of local and remote interface logic 110-1 and 110-2 are collectively referred to herein as local and remote interface logic 110. Such local and remote interface logic instances are also referred to herein as individually or collectively comprising distributed logic instances of the system 100.

The local and remote interface logic 110 of the storage nodes 102 controls interaction of the storage nodes 102 with local and remote storage devices 106 of the distributed storage system. The local persistent storage of a given one of the storage nodes 102 illustratively comprises the particular local persistent storage devices that are implemented in or otherwise associated with that storage node. It is assumed that such local persistent storage devices of the given storage node are accessible to the storage controller of that node via a local interface, and are accessible to storage controllers 108 of respective other ones of the storage nodes 102 via remote interfaces. The local and remote interface logic 110 illustratively controls the manner in which the local and remote interfaces are used to access persistent storage of the given node, as will be described in more detail elsewhere herein.

For example, it is assumed in some embodiments each of the storage devices 106 on a given one of the storage nodes 102 can be accessed by the given storage node via its local interface, or by any of the other storage nodes via a remote direct memory access (RDMA) interface. A given storage application executing on the storage nodes 102 illustratively requires that all of the storage nodes 102 be able to access all of the storage devices 106. Such access to local persistent storage of each node from the other storage nodes can be performed, for example, using the RDMA interfaces with the other storage nodes, although other arrangements are possible.

The instances of deduplication logic 111-1 and 111-2 are collectively referred to herein as deduplication logic 111. Such deduplication logic instances are also referred to herein as individually or collectively comprising distributed logic instances of the system 100.

The storage controllers 108 are illustratively configured to control performance of at least a portion of a process as described herein for selective deduplication using deduplication logic 111 of storage nodes 102. For example, the storage controllers 108 and their respective instances of deduplication logic 111 illustratively implement at least portions of the selective deduplication process to be described below in conjunction with FIG. 4. This process is an example of an algorithm implemented by logic instances deployed within the storage controllers 108.

Each of the other storage nodes 102 of the distributed storage system of FIG. 1 is assumed to be configured in a manner similar to that described above for the first storage node 102-1 and the second storage node 102-2.

The storage controllers 108 of the storage nodes 102 may include additional modules and other components typically found in conventional implementations of storage controllers and storage systems, although such additional modules and other components are omitted from the figure for clarity and simplicity of illustration.

For example, the storage controllers 108 can comprise or be otherwise associated with one or more write caches and one or more write cache journals, both also illustratively distributed across the storage nodes 102 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices 106 of the storage nodes 102 of the distributed storage system of FIG. 1.

In some embodiments, the storage nodes 102 of the distributed storage system collectively provide a scale-out all-flash content addressable storage array such as an XtremIO™ storage array from Dell EMC of Hopkinton, Mass. The storage nodes 102 can be used to implement other types of storage systems in other embodiments. One or more such storage nodes can be associated with at least one storage array, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the host devices 101 and the storage nodes 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage nodes 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

In some embodiments, the storage nodes 102 of the distributed storage system of FIG. 1 are connected to each other in a full mesh network, and are collectively managed by a system manager. A given set of local persistent storage devices 106 on a given one of the storage nodes 102 is illustratively implemented in a disk array enclosure (DAE) or other type of storage array enclosure of that storage node. The system manager is illustratively implemented as a management module or other similar management logic instance, possibly running on one or more of the storage nodes 102, on another storage node and/or on a separate non-storage node of the distributed storage system.

The distributed storage system of FIG. 1 implements functionality for selective deduplication in the storage nodes 102, utilizing instances of local and remote interface logic 110 and deduplication logic 111 of the storage controllers 108 of respective ones of the storage nodes 102, as will now be described in more detail.

As indicated previously, the storage nodes 102 of the distributed storage system of FIG. 1 process IO operations from one or more host devices 101 and in processing those IO operations run various storage application processes that generally involve interaction of that storage node with one or more other ones of the storage nodes.

Absent use of the techniques disclosed herein, applying the same type of deduplication to all storage volumes can unduly impact the processing efficiency of the storage nodes 102, leading to potentially significant degradations in the overall IO processing performance of the distributed storage system.

The distributed storage system of FIG. 1 and other illustrative embodiments herein advantageously overcome these and other problems arising from fixed deduplication approaches by providing selective deduplication in each of multiple storage nodes. For example, the distributed storage system of FIG. 1 is illustratively configured to provide selective deduplication using instances of deduplication logic 111 of respective ones of the storage nodes 102. In some embodiments, this is achieved by a selective deduplication process that distinguishes between storage volumes with relatively low deduplication potential, also referred to herein as "low-dedupe" volumes, and storage volumes with relatively high deduplication potential, also referred to herein as "high-dedupe" volumes. Such embodiments can selectively apply deduplication write flows and other related processes only to those write requests directed to high-dedupe volumes, while using non-deduplication write flows and other related processes for those write requests directed to low-dedupe volumes.

Accordingly, some embodiments disclosed herein advantageously configure a single deduplication-based storage array or other distributed storage system to store non-deduplicated data efficiently while also using deduplication mechanisms of the distributed storage system for storing deduplicated data.

These and other embodiments can provide significant performance advantages in a distributed storage system by providing sequential storage of data pages of low-dedupe volumes while also allowing maximal deduplication for high-dedupe volumes. This overcomes potential performance penalties and other drawbacks of conventional approaches that require deduplication for all storage volumes.

In operation, the distributed storage system comprising storage nodes 102 implements selective deduplication in the following exemplary manner. For each of a plurality of storage volumes, at least one processing device of the distributed storage system determines whether the storage volume has a relatively high potential deduplicability or a relatively low potential deduplicability. Responsive to determining that the storage volume has the relatively high potential deduplicability, the at least one processing device executes a first write flow in the distributed storage system for each of a plurality of write requests directed to the storage volume, with the first write flow utilizing content-based signatures of respective data pages of the storage volume to store the data pages in storage devices of the distributed storage system. Responsive to determining that the storage volume has the relatively low potential deduplicability, the at least one processing device executes a second write flow in the distributed storage system for each of a plurality of write requests directed to the storage volume, with the second write flow utilizing non-content-based signatures of respective data pages of the storage volume to store the data pages in storage devices of the distributed storage system. The "at least one processing device" referred to above illustratively comprises at least a portion of one or more of the storage nodes 102, and can include, for example, a single processing device on one of the storage nodes 102, multiple processing devices on one of the storage nodes 102, or one or more processing devices on each of one or more of the storage nodes 102, with each such processing device comprising at least one processor and at least one memory.

In some embodiments, determining whether the storage volume has a relatively high potential deduplicability or a relatively low potential deduplicability comprises obtaining a deduplicability indicator previously established for the storage volume, and making the determination based at least in part on the obtained deduplicability indicator.

Additionally or alternatively, determining whether the storage volume has a relatively high potential deduplicability or a relatively low potential deduplicability comprises generating a deduplication estimate for the storage volume, and making the determination based at least in part on comparison of the deduplication estimate for the storage volume to a threshold deduplication level.

Accordingly, the deduplicability determination in illustrative embodiments can be made in an "on-the-fly" manner, possibly by computing deduplicability estimates as needed, or can be based at least in part on deduplicability indicators that are preconfigured or otherwise previously established for respective storage volumes, such as by an administrator or other user. Numerous additional or alternative techniques, or various combinations thereof, can be used in making this determination.

The potential deduplicability of the storage volume may be expressed, for example, at least in part as an estimated deduplication ratio. Other types of deduplicability estimates or measures can be used in other embodiments. For example, the potential deduplicability of the storage volume can be determined based at least in part on an estimated deduplicability for the storage volume, an actual deduplicability achieved for that storage volume at some point in the past, general knowledge or user-specific knowledge regarding typical deduplicability for particular types of storage volumes, machine learning results associating particular deduplicability levels with particular types of storage volumes, or numerous other techniques, as well as various combinations of multiple such techniques. The term "potential deduplicability" as used herein is therefore intended to be broadly construed.

Moreover, although illustrative embodiments herein refer to relatively high potential deduplicability and relatively low potential deduplicability, these terms are also intended to be broadly construed, and may refer, for example, to different deduplicability levels on respective different sides of a specified deduplicability threshold, or to a deduplicability level above a high threshold and a deduplicability level below a low threshold, and to numerous other arrangements involving at least two distinct types of relative deduplicability. For example, although two types of relative deduplicability are used in some embodiments, other embodiments can implement selective deduplication using more than two different types of relative deduplicability. These and other arrangements are intended to be encompassed by the general term "selective deduplication" as broadly used herein.

In some embodiments, each of at least a subset of the storage nodes 102 of the distributed storage system comprises a set of processing modules configured to communicate with corresponding sets of processing modules on other ones of the storage nodes 102. A given such set of processing modules illustratively comprises at least a routing module, a control module and a data module, with the sets of processing modules of the storage nodes of the distributed storage system collectively comprising at least a portion of a distributed storage controller of the distributed storage system. Examples of such sets of processing modules are described in more detail below in conjunction with FIGS. 2 and 3.

In some embodiments, the first write flow for each of one or more of the write requests directed to the storage volume comprises receiving the write request in one of the routing modules, computing in the routing module a content-based signature for a data page of the write request, selecting in the routing module a particular one of the control modules based at least in part on a logical address of the data page, sending the write request and the content-based signature from the routing module to the selected control module, selecting in the control module a particular one of the data modules based at least in part on the content-based signature, and sending the data page from the control module to the selected data module for storage of the data page based at least in part on the content-based signature.

Additionally or alternatively, the second write flow for each of one or more of the write requests directed to the storage volume comprises receiving the write request in one of the routing modules, selecting in the routing module a particular one of the control modules based at least in part on a logical address of the data page, sending the write request from the routing module to the selected control module, generating in the control module a non-content-based signature for a data page of the write request, selecting in the control module a particular one of the data modules based at least in part on the non-content-based signature, and sending the data page from the control module to the selected data module for storage of the data page based at least in part on the non-content-based signature.

The non-content-based signature in some embodiments is generated for the data page based at least in part on an identifier of the storage volume and an offset of the data page within the storage volume. For example, various combinations of the identifier of the storage volume and a logical address of the data page within the storage volume can be used to generate the non-content-based signature. Such a non-content-based signature uniquely identifies the data page among all other data pages of the distributed storage system, and in some embodiments herein is referred to as an "artificial signature." An artificial signature or other type of non-content-based signature in some embodiments herein is utilized to provide sequential storage for data pages of low-dedupe volumes, in contrast to a content-based signature, such as a hash digest or hash handle, that is generated from data page content and used to provide deduplicated storage for data pages of high-dedupe volumes.

In some embodiments, non-content-based signatures are not explicitly stored within the distributed storage system, as content-based signatures are, but instead are used by the deduplication mechanism of the system as a way of treating both high-dedupe and low-dedupe data within a common framework. For example, in a metadata structure such as an A2H tree, metadata for deduped data associates logical addresses of data pages with corresponding content-based signatures of those data pages. If non-content-based signatures generated from volume identifiers and logical addresses are used for non-deduped data, this type of A2H tree is redundant, since the non-content-based signatures can be generated "on-the-fly" from the corresponding volume identifiers and logical addresses. It would therefore be wasteful to generate such signatures in advance and store them in the system. However, the non-content-based signatures are still useful to facilitate communication between different components of the distributed storage system, such as routing, control and data modules.

The non-content-based signature is utilized in reading the data page from a plurality of storage devices associated with the selected data module, illustratively by utilizing a read flow that includes receiving a read request in one of the routing modules, the read request comprising an identifier of the storage volume and a logical address of the data page within the storage volume, selecting in the routing module a particular one of the control modules based at least in part on a logical address of the data page, sending the read request from the routing module to the selected control module, obtaining in the control module the non-content-based signature for the data page, selecting in the control module a particular one of the data modules based at least in part on the non-content-based signature, and sending from the control module to the selected data module a request for retrieval of the data page based at least in part on the non-content-based signature. Other types of read flows can be used in other embodiments.

It is assumed in some embodiments that each of the storage nodes 102 incorporates substantially the same functionality for selective deduplication using its corresponding instance of the deduplication logic 111.

Such selective deduplication functionality in the distributed storage system of FIG. 1 is illustratively implemented at least in part by or under the control of the instances of deduplication logic 111 operating in cooperation with the instances of local and remote interface logic 110 in the storage controllers 108 of the respective first and second storage nodes 102. The other storage nodes 102 of the distributed storage system of FIG. 1 are assumed to operate in a manner similar to that described above for the first and second storage nodes 102.

These and other features of illustrative embodiments disclosed herein are examples only, and should not be construed as limiting in any way. Other types of selective deduplication may be used in other embodiments, and the term "selective deduplication" as used herein is intended to be broadly construed.

Additional examples of illustrative processes for selective deduplication implementing at least some of the above-described functionality will be provided below in conjunction with the flow diagrams of FIGS. 4 and 5.

The storage nodes 102 collectively comprise an example of a distributed storage system. The term "distributed storage system" as used herein is intended to be broadly construed, so as to encompass, for example, clustered storage systems or other types of storage systems distributed over multiple storage nodes.

The storage nodes 102 in some embodiments are part of a distributed content addressable storage system in which logical addresses of data pages are mapped to physical addresses of the data pages in the storage devices 106 using respective content-based signatures that are generated from those data pages, as will now be described in more detail with reference to the illustrative embodiments of FIGS. 2 and 3.

Figure 2:
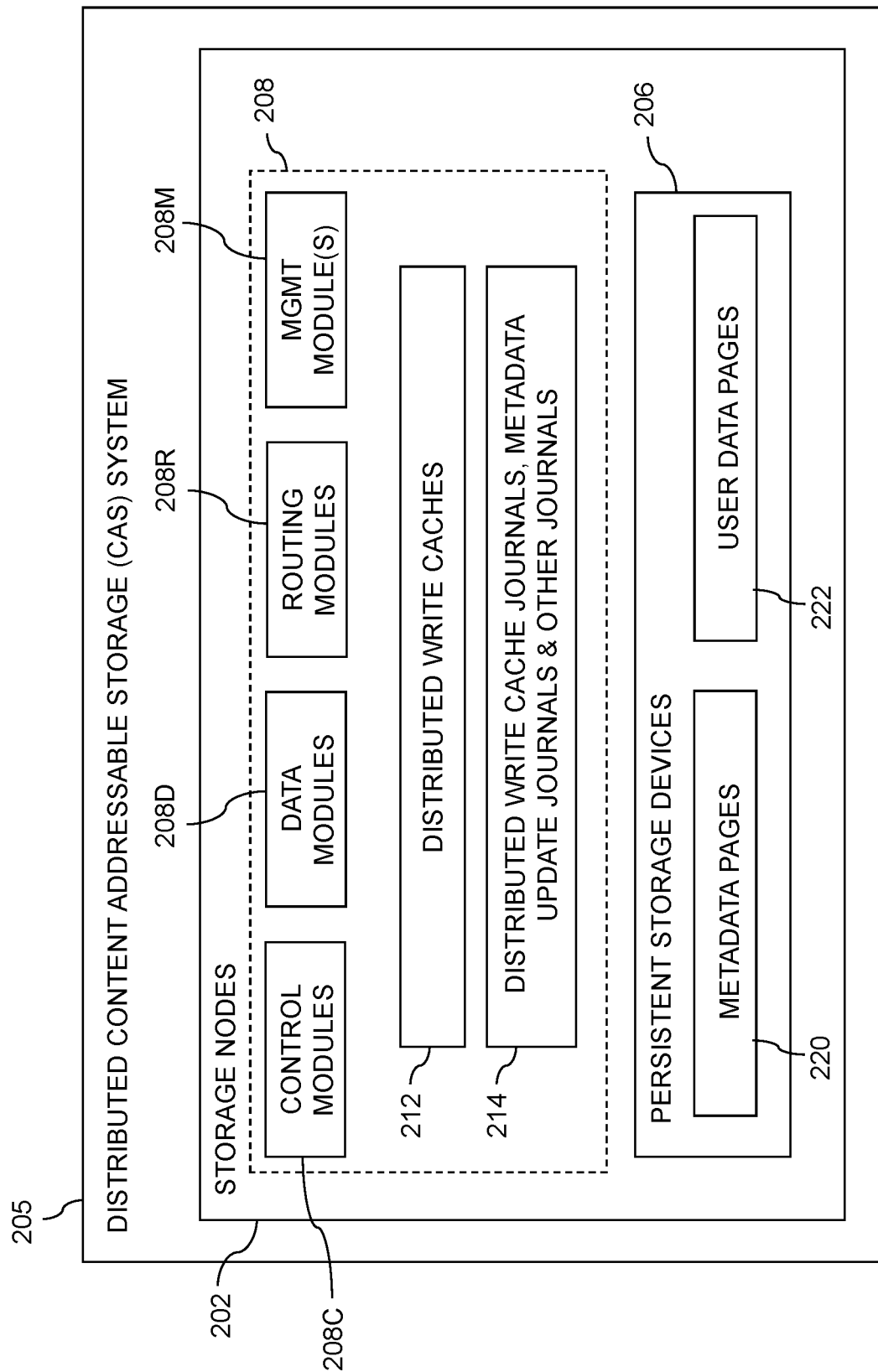
FIG. 2 shows an example of a distributed content addressable storage (CAS) system that illustratively represents one possible implementation of a distributed storage system in some embodiments.

FIG. 2 shows an example of a distributed content addressable storage (CAS) system 205 that illustratively represents a particular example implementation of the distributed storage system comprising the storage nodes 102 of FIG. 1. The distributed CAS system 205 is therefore assumed to be coupled to one or more host devices 101 of a computer system within information processing system 100.

The CAS system 205 comprises a plurality of persistent storage devices 206 and an associated storage controller 208. The storage devices 206 store data of a plurality of storage volumes. The storage volumes illustratively comprise respective LUNs or other types of logical storage volumes. The stored data comprises metadata pages 220 and user data pages 222, both described in more detail elsewhere herein. The storage devices 206 and storage controller 208 are distributed across multiple storage nodes 202. The CAS system 205 can include additional components, such as local and remote interface logic and destaging logic, each also illustratively distributed across the storage nodes 202 of the CAS system 205.

The CAS system 205 is illustratively implemented as a distributed storage system, also referred to herein as a clustered storage system, in which each of at least a subset of the storage nodes 202 comprises a set of processing modules configured to communicate with corresponding sets of processing modules on other ones of the storage nodes 202. The sets of processing modules of the storage nodes of the CAS system 205 collectively comprise at least a portion of the storage controller 208 of the CAS system 205. For example, in some embodiments the sets of processing modules of the storage nodes collectively comprise a distributed storage controller of the CAS system 205. A "distributed storage system" as that term is broadly used herein is intended to encompass any storage system that, like the CAS system 205, is distributed across multiple storage nodes.

Although it is assumed that both the first storage node 102-1 and the second storage node 102-2 are part of a single content addressable storage system in some embodiments, other types of storage systems can be used for one or both of the first storage node 102-1 and the second storage node 102-2 in other embodiments. For example, it is possible that at least one of the storage nodes 102 in an illustrative embodiment need not be a storage node of a content addressable storage system and such a storage node need not include an ability to generate content-based signatures. In an embodiment of this type, the signature generation functionality can be implemented in a host device.

The storage controller 208 in the present embodiment is configured to implement functionality for selective deduplication in a distributed storage system of the type previously described in conjunction with FIG. 1.

The storage controller 208 includes distributed write caches 212 and a set of distributed journals 214. The set of distributed journals 214 illustratively comprises a write cache journal, a metadata update journal and possibly one or more other journals. The distributed write caches 212 and the set of distributed journals 214 each illustratively have respective instances thereof on each of the storage nodes 202.

Additional modules that are assumed to be implemented in the storage controller 208 but are not explicitly shown in the figure include, for example, distributed instances of local and remote interface logic 110 and deduplication logic 111, with respective different instances thereof being implemented on respective ones of the storage nodes 202. Each of the storage nodes 202 of the CAS system 205 is assumed to be implemented using at least one processing device comprising a processor coupled to a memory.

In the CAS system 205, logical addresses of data pages are mapped to physical addresses of the data pages using respective content-based signatures that are generated from those data pages. The data pages illustratively include user data pages 222. Metadata pages 220 are typically handled in a different manner, as will be described.

The term "page" as used in this and other contexts herein is intended to be broadly construed so as to encompass any of a wide variety of different types of blocks that may be utilized in a block storage device of a storage system. Different native page sizes are generally utilized in different storage systems of different types. For example, XtremIO™ X1 storage arrays utilize a native page size of 8 kilobytes (KB), while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing data pages of the CAS system 205.

Also, the term "storage volume" as used herein is intended to be broadly construed, and should not be viewed as being limited to any particular format or configuration.

The content-based signatures utilized in some embodiments illustratively comprise respective hash digests of respective data pages of a storage volume. A given one of the hash digests is generated in illustrative embodiments by applying a secure hashing algorithm to content of a corresponding one of the data pages of the storage volume. For example, a given hash digest can be generated by application of a hash function such as the well-known Secure Hashing Algorithm 1 (SHA1) to the content of its corresponding data page. Other types of secure hashing algorithms, such as SHA2 or SHA256, or more generally other hash functions, can be used in generating content-based signatures herein.

A given hash digest in illustrative embodiments is unique to the particular content of the page from which it is generated, such that two pages with exactly the same content will have the same hash digest, while two pages with different content will have different hash digests. It is also possible that other types of content-based signatures may be used, such as hash handles of the type described elsewhere herein. A hash handle generally provides a shortened representation of its corresponding hash digest. More particularly, the hash handles are shorter in length than respective hash digests that are generated by applying a secure hashing algorithm to respective ones of the data pages. Hash handles are considered examples of "content-based signatures" as that term is broadly used herein.

As indicated above, the storage controller 208 in this embodiment is implemented as a distributed storage controller that comprises sets of processing modules distributed over the storage nodes 202. The storage controller 208 is therefore an example of what is more generally referred to herein as a distributed storage controller.

It is assumed in some embodiments that the processing modules of the storage controller 208 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of the storage controller 208 illustratively comprise control modules 208C, data modules 208D, routing modules 208R and at least one management module 208M. Again, these and possibly other processing modules of the storage controller 208 are illustratively interconnected with one another in the full mesh network, such that each of the modules can communicate with each of the other modules, although other types of networks and different module interconnection arrangements can be used in other embodiments.

The management module 208M of the distributed storage controller in this embodiment may more particularly comprise a system-wide management module, also referred to herein as a system manager. Other embodiments can include multiple instances of the management module 208M implemented on different ones of the storage nodes 202. It is therefore assumed that the storage controller 208 comprises one or more management modules 208M.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The processing modules of the storage controller 208 as disclosed herein utilize metadata structures that include logical layer and physical layer mapping tables to be described below. It is to be appreciated that these particular tables are only examples, and other tables or metadata structures having different configurations of entries and fields can be used in other embodiments. The logical layer and physical layer mapping tables in this embodiment illustratively include the following:

1. An address-to-hash ("A2H") table. The A2H table illustratively comprises a plurality of entries accessible utilizing logical addresses as respective keys, with each such entry of the A2H table comprising a corresponding one of the logical addresses, a corresponding one of the hash handles, and possibly one or more additional fields. In some embodiments, the A2H table is assumed to comprise full hash digests in place of or in addition to hash handles. Other configurations are possible, and the term "address-to-hash table" as used herein is therefore intended to be broadly construed.

2. A hash-to-data ("H2D") table. The H2D table illustratively comprises a plurality of entries accessible utilizing hash handles as respective keys, with each such entry of the H2D table comprising a corresponding one of the hash handles, a physical offset of a corresponding one of the data pages, and possibly one or more additional fields. Again, full hash digests can be used in place of or in addition to hash handles.

3. A hash metadata ("HMD") table. The HMD table illustratively comprises a plurality of entries accessible utilizing hash handles as respective keys. Each such entry of the HMD table comprises a corresponding one of the hash handles, a corresponding reference count and a corresponding physical offset of one of the data pages. A given one of the reference counts denotes the number of logical pages in the storage system that have the same content as the corresponding data page and therefore point to that same data page via their common hash digest. The HMD table illustratively comprises at least a portion of the same information that is found in the H2D table. Accordingly, in other embodiments, those two tables can be combined into a single table, illustratively referred to as an H2D table, an HMD table or another type of physical layer mapping table providing a mapping between hash values, such as hash handles or hash digests, and corresponding physical addresses of data pages.

4. A physical layer based ("PLB") table. The PLB table illustratively comprises a plurality of entries accessible utilizing physical offsets as respective keys, with each such entry of the PLB table comprising a corresponding one of the physical offsets, a corresponding one of the hash digests, and possibly one or more additional fields.

As indicated above, the hash handles are generally shorter in length than the corresponding hash digests of the respective data pages, and each illustratively provides a short representation of the corresponding full hash digest. For example, in some embodiments, the full hash digests are 20 bytes in length, and their respective corresponding hash handles are illustratively only 4 or 6 bytes in length. Hash digests can be used in place of or in addition to hash handles in some embodiments.

Again, the logical layer and physical layer mapping tables referred to above are examples only, and can be varied in other embodiments. For example, other types of hash-to-physical ("H2P") mapping tables may be used in addition to or in place of the above-noted H2D, HMD and/or PLB tables.

In some embodiments, certain ones of the above-described mapping tables are maintained by particular modules of storage controller 208. For example, the mapping tables maintained by the control modules 208C illustratively comprise at least one A2H table and possibly also at least one H2D table. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based signatures, as described in further detail elsewhere herein.

The control modules 208C may further comprise additional components such as respective messaging interfaces that are utilized by the control modules 208C to process routing-to-control messages received from the routing modules 208R, and to generate control-to-routing messages for transmission to the routing modules 208R. Such messaging interfaces can also be configured to process instructions and other messages received from the management module 208M and to generate messages for transmission to the management module 208M.

The data modules 208D comprise respective control interfaces. These control interfaces support communication between the data modules 208D and the control modules 208C. Also included in the data modules are respective SSD interfaces. These SSD interfaces support communications with corresponding ones of the storage devices 206 of the CAS system 205.

The above-described processing module arrangements are presented by way of example only, and can be varied in other embodiments.

In some embodiments, a given data path of the CAS system 205 comprises a particular one of the routing modules 208R, a particular one of the control modules 208C and a particular one of the data modules 208D, each configured to handle different stages of the data path. For example, a given IO request can comprise a read request or a write request received in the particular control module from the particular routing module. The particular control module processes the received IO request to determine the particular data module that has access to the one or more data pages targeted by that IO request.

Communication links may be established between the various processing modules of the storage controller 208 using well-known communication protocols such as TCP/IP and RDMA. For example, respective sets of IP links used in data transfer and corresponding messaging could be associated with respective different ones of the routing modules 208R.

In some embodiments, at least portions of the functionality for selective deduplication in the CAS system are distributed over at least the control modules 208C and data modules 208D of storage controller 208. Numerous other arrangements are possible. For example, portions of the functionality can be implemented in the one or more management modules 208, or using other types and arrangements of modules within or outside of the storage controller 208.

As indicated previously, the storage devices 206 are configured to store metadata pages 220 and user data pages 222, and one or more of the journals in the set of distributed journals 214, and may also store additional information not explicitly shown such as, for example, one or more system checkpoints and/or snapshots of storage volumes. The metadata pages 220 and the user data pages 222 in some embodiments are illustratively stored in respective designated metadata and user data areas of the storage devices 206. Accordingly, metadata pages 220 and user data pages 222 may be viewed as corresponding to respective designated metadata and user data areas of the storage devices 206.

As noted above, a given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 220 and the user data pages 222.

The user data pages 222 are part of a plurality of logical storage volumes configured to store files, blocks, objects or other arrangements of data, each also generally referred to herein as a "data item," on behalf of users of the CAS system 205. Each such logical storage volume may comprise particular ones of the above-noted user data pages 222 of the user data area. The user data stored in the user data pages 222 can include any type of user data that may be utilized in the system 100. The term "user data" herein is therefore also intended to be broadly construed.

A given storage volume for which content-based signatures are generated, illustratively by signature generators implemented in respective ones of the control modules 208C and/or elsewhere in the storage nodes 202, can comprise a set of one or more LUNs, each including multiple ones of the user data pages 222 stored in storage devices 206.

The CAS system 205 in the embodiment of FIG. 2 is configured to generate hash metadata providing a mapping between content-based digests of respective ones of the user data pages 222 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 222. The hash metadata generated by the CAS system 205 is illustratively stored as metadata pages 220 in the metadata area. The generation and storage of the hash metadata is assumed to be performed under the control of the storage controller 208.

Each of the metadata pages 220 characterizes a plurality of the user data pages 222. For example, in a given set of user data pages representing a portion of the user data pages 222, each of the user data pages is characterized by a volume identifier, an offset and a content-based signature. The content-based signature is generated as a hash function of content of the corresponding user data page. Illustrative hash functions that may be used to generate the content-based signature include the above-noted SHA1 secure hashing algorithm, or other secure hashing algorithms known to those skilled in the art, including SHA2, SHA256 and many others. The content-based signature is utilized to determine the location of the corresponding user data page within the user data area of the storage devices 206.

Each of the metadata pages 220 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 220 in an illustrative embodiment comprises metadata pages having respective signatures. Each such metadata page characterizes a different set of user data pages. For example, the characterizing information in each metadata page can include the volume identifiers, offsets and content-based signatures for each of the user data pages that are characterized by that metadata page. It is to be appreciated, however, that the user data and metadata page configurations described above are examples only, and numerous alternative user data and metadata page configurations can be used in other embodiments.

Ownership of a user data logical address space within the CAS system 205 is illustratively distributed among the control modules 208C.

The functionality for selective deduplication in the CAS system 205 in this embodiment is assumed to be distributed across multiple distributed processing modules, including at least a subset of the processing modules 208C, 208D, 208R and 208M of the storage controller 208.

For example, the management module 208M of the storage controller 208 may include a deduplication logic instance that engages corresponding deduplication logic instances in all of the control modules 208C in order to support selective deduplication in the CAS system 205.

In some embodiments, each of the user data pages 222 has a fixed size such as, for example, 8 KB, and its content-based signature is a 20-byte signature generated using the SHA1 secure hashing algorithm. Also, each page has a volume identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as the SHA1 secure hashing algorithm to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

The storage controller 208 in this example is configured to group consecutive pages into page groups, to arrange the page groups into slices, and to assign the slices to different ones of the control modules 208C. For example, if there are 1024 slices distributed evenly across the control modules 208C, and there are a total of 16 control modules in a given implementation, each of the control modules "owns" 1024/16=64 slices. In such arrangements, different ones of the slices are assigned to different ones of the control modules 208C such that control of the slices within the storage controller 208 of the CAS system 205 is substantially evenly distributed over the control modules 208C of the storage controller 208.

The data modules 208D allow a user to locate a given user data page based on its signature. Each metadata page also has a size of 8 KB and includes multiple instances of the <lun_id, offset, signature> for respective ones of a plurality of the user data pages 222. Such metadata pages 220 are illustratively generated by the control modules 208C but are accessed using the data modules 208D based on a metadata page signature.

The metadata page signature in this embodiment is a 20-byte signature but is not based on the content of the metadata page. Instead, the metadata page signature is generated based on an 8-byte metadata page identifier that is a function of the volume identifier and offset information of that metadata page.

If a user wants to read a user data page having a particular volume identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the data module. This metadata page will include the <lun_id, offset, signature> for the user data page if the user page exists. The signature of the user data page is then used to retrieve that user data page, also via the data module.

Write requests processed in the CAS system 205 each illustratively comprise one or more IO operations directing that at least one data item of the CAS system 205 be written to in a particular manner. A given write request is illustratively received in the CAS system 205 from one of the host devices 101 over network 104. In some embodiments, a write request is received in the storage controller 208 of the CAS system 205, and directed from one processing module to another processing module of the storage controller 208. For example, a received write request may be directed from a routing module 208R of the storage controller 208 to a particular control module 208C of the storage controller 208. Other arrangements for receiving and processing write requests from one or more of the host devices 101 can be used.

The term "write request" as used herein is intended to be broadly construed, so as to encompass one or more IO operations directing that at least one data item of a storage system be written to in a particular manner. A given write request is illustratively received in a storage system from a host device.

In some embodiments, the control modules 208C, data modules 208D and routing modules 208R of the storage nodes 202 communicate with one another over a high-speed internal network such as an InfiniBand network. The control modules 208C, data modules 208D and routing modules 208R coordinate with one another to accomplish various IO processing tasks, as described elsewhere herein.

The write requests from the host devices identify particular data pages to be written in the CAS system 205 by their corresponding logical addresses each illustratively comprising a volume identifier and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The CAS system 205 illustratively utilizes a two-level mapping process to map logical block addresses to physical block addresses. In some embodiments, the first level of mapping uses an A2H table and the second level of mapping uses an HMD table, with the A2H and HMD tables corresponding to respective logical and physical layers of the content-based signature mapping within the CAS system 205. The HMD table or a given portion thereof in some embodiments disclosed herein is more particularly referred to as an H2D table or H2P table, although it is to be understood that these and other mapping tables or other metadata structures referred to herein can be varied in other embodiments.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 206. This is also referred to as physical layer mapping.

Examples of these and other metadata structures utilized in illustrative embodiments were described elsewhere herein. These particular examples illustratively include respective A2H, H2D, HMD and PLB tables. In some embodiments, the A2H and H2D tables are utilized primarily by the control modules 208C, while the HMD and PLB tables are utilized primarily by the data modules 208D.

For a given write request, hash metadata comprising at least a subset of the above-noted tables is updated in conjunction with the processing of that write request.

The A2H, H2D, HMD and PLB tables described above are examples of what are more generally referred to herein as "mapping tables" of respective distinct types. Other types and arrangements of mapping tables or other content-based signature mapping information may be used in other embodiments.

Such mapping tables are still more generally referred to herein as "metadata structures" of the CAS system 205. It should be noted that additional or alternative metadata structures can be used in other embodiments. References herein to particular tables of particular types, such as A2H, H2D, HMD and PLB tables, and their respective configurations, should be considered non-limiting and are presented by way of illustrative example only. Such metadata structures can be implemented in numerous alternative configurations with different arrangements of fields and entries in other embodiments.

The logical block addresses or LBAs of a logical layer of the CAS system 205 correspond to respective physical blocks of a physical layer of the CAS system 205. The user data pages of the logical layer are organized by LBA and have reference via respective content-based signatures to particular physical blocks of the physical layer.

Each of the physical blocks has an associated reference count that is maintained within the CAS system 205. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 208C, 208D, 208R and 208M as shown in the FIG. 2 embodiment is presented by way of example only. Numerous alternative arrangements of processing modules of a distributed storage controller may be used to implement selective deduplication in a distributed CAS system or other type of distributed storage system in other embodiments.

Additional examples of content addressable storage functionality that may be implemented in some embodiments by control modules 208C, data modules 208D, routing modules 208R and management module(s) 208M of storage controller 208 can be found in U.S. Pat. No. 9,104,326, entitled "Scalable Block Data Storage Using Content Addressing," which is incorporated by reference herein. Alternative arrangements of these and other storage node processing modules of a distributed storage controller in a distributed CAS system or other type of distributed storage system can be used in other embodiments.

As indicated above, the CAS system 205 illustratively comprises storage nodes 202 interconnected in a mesh network, with each such storage node comprising a set of processing modules configured to communicate with corresponding sets of processing modules on other ones of the storage nodes. A given such set of processing modules comprises at least a routing module, a control module and a data module, with the sets of processing modules of the storage nodes 202 of the CAS system 205 collectively comprising at least a portion of the storage controller 208 of the CAS system 205.

The storage nodes 202 and their respective sets of processing modules are managed by a system manager, illustratively implemented as a management module 208M within the set of processing modules on at least one of the storage nodes 202. Each of the storage nodes 202 illustratively comprises a CPU or other type of processor, a memory, a network interface card (NIC) or other type of network interface, and a subset of the storage devices 206, possibly arranged as part of a DAE of the storage node. These and other references to "disks" herein are intended to refer generally to storage devices, including SSDs, and should therefore not be viewed as limited in any way to spinning magnetic media.

An example of the operation of the CAS system 205 in processing IO operations will now be described with reference to FIG. 3, which shows the relationship between routing, control and data modules of one possible distributed implementation of CAS system 205 in an illustrative embodiment. More particularly, FIG. 3 illustrates a portion 300 of the CAS system 205, showing a routing module 208R-x, a control module 208C-y and a data module 208D-z in a distributed implementation of the storage controller 208. The routing module 208R-x, the control module 208C-y and the data module 208D-z are also denoted in this embodiment as an R module, a C module and a D module, respectively.

These modules are respective processing modules of the storage controller 208, and are potentially located on different ones of the storage nodes 202 of the CAS system 205. For example, each of the storage nodes 202 of the CAS system 205 illustratively comprises at least one R module, at least one C module and at least one D module, although many other storage node configurations are possible. In the present embodiment, the routing module 208R-x, the control module 208C-y and the data module 208D-z are assumed to be on respective different storage nodes x, y and z of the CAS system 205. The storage nodes x, y and z represent respective particular ones of the storage nodes 202. The storage node z that implements the D module 208D-z comprises a subset of the storage devices 206 of the CAS system 205, with the subset of storage devices 206 on storage node z being denoted as storage devices 206-z. Each of the other storage nodes 202 of the CAS system 205 similarly has a different subset of the storage devices 206 associated therewith.

It is assumed in this example that the CAS system 205 manages data using a fixed-size page granularity (e.g., 4 KB, 8 KB or 16 KB), also referred to herein as the native page size of the CAS system 205. A unique hash digest is computed for each of the data pages by a content-based signature generator, illustratively using SHA1 or another secure hashing algorithm of the type described elsewhere herein.

In the CAS system 205, routing modules 208R such as R module 208R-x illustratively include a storage command parser as shown, such as a SCSI command parser, although other command parsers for other storage protocols can be used in other embodiments. The routing modules 208R receive IO requests from one or more of the host devices 101, parse the corresponding storage commands and route them to the appropriate control modules 208C, which may be located on different storage nodes 202, illustratively using an address-to-control ("A2C") table. The A2C table maps different portions of a logical address space of the CAS system 205 across different ones of the control modules 208C. A given IO request can be sent by the corresponding one of the host devices 101 to any of the routing modules 208R of the CAS system 205.

The control modules 208C such as control module 208C-y receive the IO requests from the routing modules 208R, and use mapping tables such as the above-described A2H and H2D tables to identify the appropriate data modules 208D that store the corresponding data pages in the distributed CAS system 205. This illustratively includes performing a logical address to hash mapping as shown in the figure.

In processing read requests, the C module 208C-y retrieves from the A2H table the hash digests of the corresponding requested pages, and sends read requests to the appropriate data modules 208D based on the H2D table.

In processing write requests, the C module 208C-y illustratively computes the hash digests of the data pages based on the write data, sends write requests to the corresponding data modules 208D as determined from the H2D table, and updates the A2H table.

The data modules 208D such as D module 208D-z are responsible for the physical storage of the data pages, and use mapping tables such as the above-described HMD and PLB tables and/or other types of H2P tables to determine the physical location of a given data page in the subset of storage devices 206 associated with that data module, using a hash digest, hash handle or other content-based signature supplied by a control module. This illustratively includes performing a hash to physical location mapping as shown in the figure. Such a hash to physical location mapping can utilize an H2P table of the type described elsewhere herein, illustratively comprising at least portions of the above-noted HMD and PLB tables. The data modules 208D in some embodiments additionally store a copy or "mirror" of such metadata in a memory of the respective corresponding storage nodes 202, in order to optimize performance by reducing accesses to the associated storage devices 206 during system operation.

A given one of the host devices 101 illustratively sends an IO request to a particular one of the routing modules 208R, possibly using random selection or another type of algorithm such as round robin to select a particular routing module for a particular IO request. Such selection can be implemented as part of a path selection algorithm performed by a multi-path input-output (MPIO) driver of the host device, in order to select a particular path comprising an initiator-target pair for delivery of the IO request to the CAS system 205. The initiator illustratively comprises a particular host bus adaptor (HBA) of the given host device, and the target illustratively comprises a particular port of the CAS system 205.

The processing of write requests in the CAS system 205 makes use of the distributed write caches 212 and the distributed write cache journals of the set of distributed journals 214. Each of the write caches 212 illustratively comprises a volatile memory of the CAS system 205 for temporarily storing data pages associated with write requests received from the host devices 101. The write caches 212 are backed up by corresponding write cache journals that store persisted copies of the write data. The write data of the write caches 212 is later "destaged" to persistent data storage locations in the storage devices 206.

The above-described deduplication mechanisms of the CAS system 205 are illustratively applied to storage volumes with relatively high potential deduplicability, while storage volumes with relatively low potential deduplicability are not subject to deduplication in the CAS system 205, as will be described in more detail below. Accordingly, the CAS system 205 is an example of a single distributed storage system that is configured to store non-deduplicated data efficiently while also using deduplication mechanisms of the distributed storage system for storing deduplicated data.

The CAS system 205 is therefore advantageously configured to provide selective deduplication in the storage nodes 202 using operations similar to those previously described in conjunction with FIG. 1.

These and other operations associated with selective deduplication in the CAS system 205 are illustratively performed at least in part by or under the control of the storage controller 208 and at least a subset of its processing modules 208C, 208D, 208R and 208M.

The particular features described above in conjunction with FIGS. 1, 2 and 3 should not be construed as limiting in any way, and a wide variety of other distributed implementations of storage nodes 102 or 202 are possible.

Figure 3:
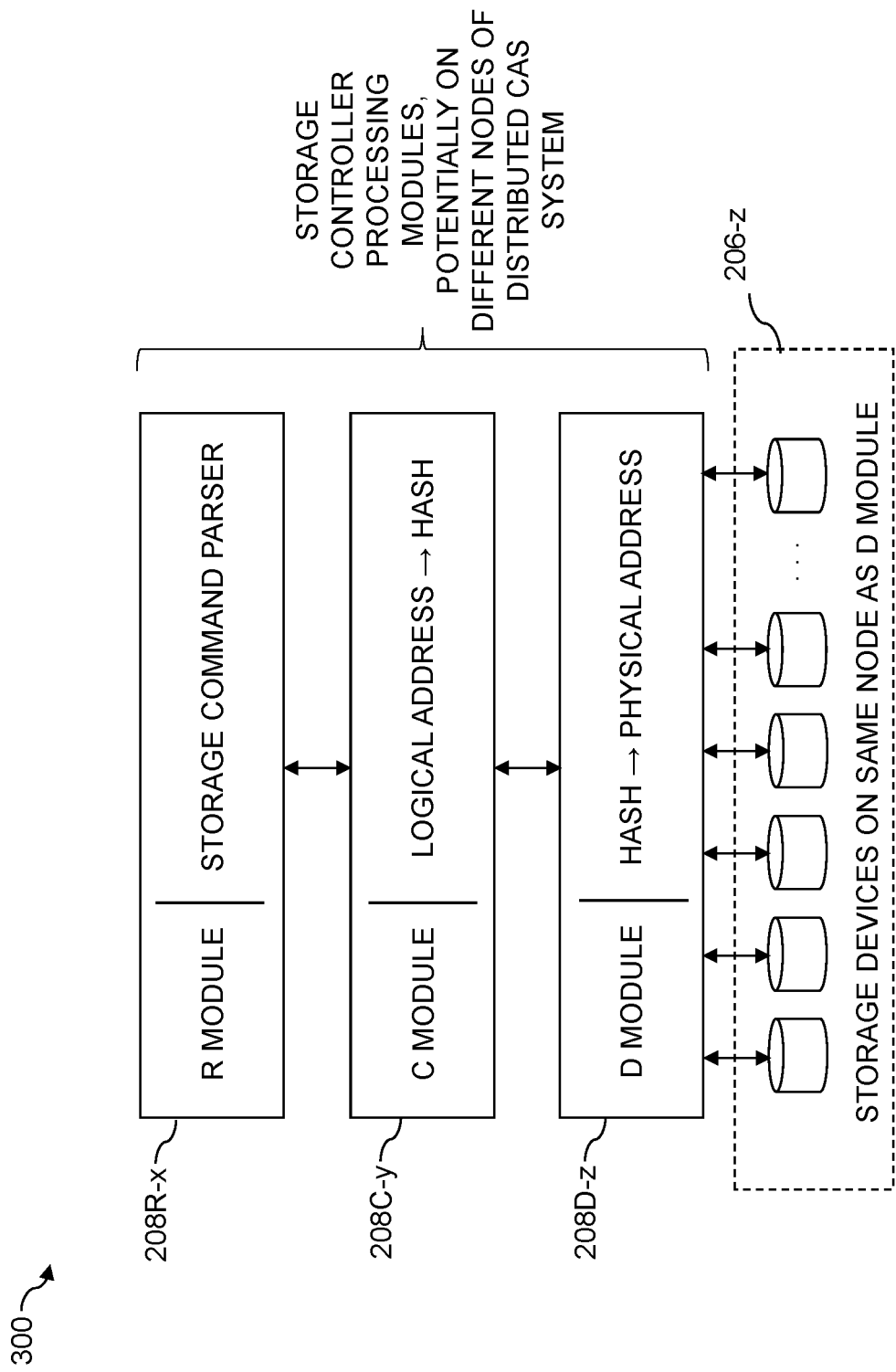
FIG. 3 shows an example relationship between routing, control and data modules of the distributed CAS system of FIG. 2 in an illustrative embodiment.

The particular sets of storage nodes 102 or 202 of the respective example distributed storage systems illustrated in FIGS. 1, 2 and 3 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes may be implemented on respective distinct processing platforms, although numerous other arrangements are possible. At least portions of their associated host devices may be implemented on the same processing platforms as the storage nodes or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage nodes 102 to reside in different data centers. Numerous other distributed implementations of the storage nodes 102 and their respective associated sets of host devices are possible. Similarly, various distributed implementations of CAS system 205 and its storage nodes 202 are possible.

Additional examples of processing platforms utilized to implement storage systems and possibly their associated host devices in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as host devices 101, storage nodes 102 or 202, network 104, storage devices 106 or 206, storage controllers 108 or 208, local and remote interface logic 110 and deduplication logic 111 can be used in other embodiments.

It should be understood that the particular sets of modules and other components implemented in a distributed storage system as illustrated in FIGS. 1, 2 and 3 are presented by way of example only. In other embodiments, only subsets of these components, or additional or alternative sets of components, may be used, and such components may exhibit alternative functionality and configurations.

For example, in other embodiments, functionality for selective deduplication can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 4, which implements a process for selective deduplication in a distributed storage system. This process may be viewed as an example algorithm implemented at least in part by the storage controllers 108 of the respective storage nodes 102 of the distributed storage system of FIG. 1. For example, such an algorithm is illustratively carried out by one or more instances of deduplication logic 111 in respective ones of the storage controllers 108. Such an algorithm can also be implemented by the distributed storage controller 208 and its processing modules 208C, 208D, 208R and 208M distributed over the storage nodes 202 of CAS system 205 of FIG. 2. These and other algorithms disclosed herein are more generally applicable to a wide variety of other distributed storage systems each comprising two or more storage nodes.

Figure 4:
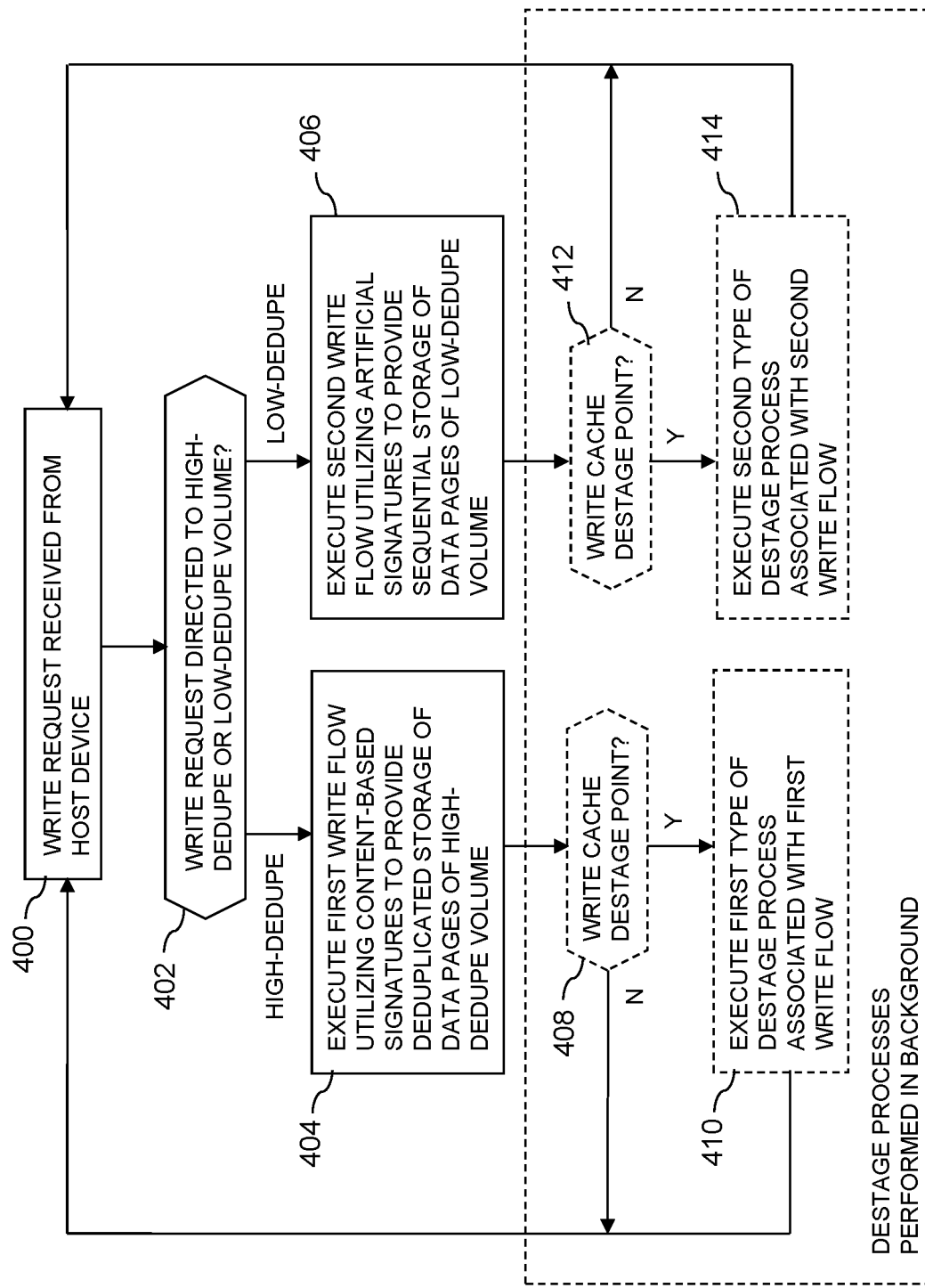
FIG. 4 is a flow diagram of an example selective deduplication process in an illustrative embodiment.

Referring now to FIG. 4, the selective deduplication process as illustrated includes steps 400 through 414, and implements selective deduplication in multiple storage nodes of a distributed storage system. It is assumed that the steps of the process are performed by multiple storage nodes of the distributed storage system, which may illustratively include the storage nodes 102-1 and 102-2 of FIG. 1, and possibly additional storage nodes 102-3 through 102-N, or at least a subset of the storage nodes 202 of FIG. 2. The other storage nodes 102 or 202 are assumed to implement similar functionality.

In step 400, a write request is received from a host device. Although reference is made to a single write request in the figure, in some embodiments multiple write requests directed to the same storage volume may be received in step 400. Accordingly, determinations referred to below can be performed for multiple write requests at the same time, and need not be made individually on a per-request basis.

In step 402, a determination is made as to whether the write request is directed to a high-dedupe volume or a low-dedupe volume. If the write request is directed to a high-dedupe volume, the process moves to step 404, and if the write request is directed to a low-dedupe volume, the process moves to step 406. It is assumed in this embodiment that each storage volume is either a high-dedupe volume or a low-dedupe volume, although other arrangements are possible. For example, there may be more than two relative levels of deduplicability for storage volumes in some embodiments. Also, as indicated elsewhere herein, the deduplicability determination can be made "on-the-fly" by computing deduplicability estimates as needed, or can be based at least in part on deduplicability indicators that are preconfigured or otherwise previously established for respective storage volumes, such as by an administrator or other user. Numerous other techniques can be used in determining deduplicability of a given storage volume.

In step 404, a first write flow is executed utilizing content-based signatures of the type described elsewhere herein, in order to provide deduplicated storage of data pages of the high-dedupe volume.

In step 406, a second write flow is executed utilizing artificial signatures of the type described elsewhere herein, in order to provide sequential storage of data pages of the low-dedupe volume. In some embodiments, the artificial signature is generated for the data page based at least in part on an identifier of the storage volume and an offset of the data page within the storage volume. For example, the artificial signature can comprise a combination of an identifier of the storage volume and a logical address of the data page within the storage volume. It is assumed in some embodiments herein that the artificial signature uniquely identifies the data page among all other data pages of the distributed storage system. Other types of non-content-based signatures can be used in other embodiments.

Multiple destage processes are illustratively performed by the distributed storage system in the FIG. 4 process, with such processes being performed in the background of the processing of write requests through steps 400 through 406. These destage processes include steps 408, 410, 412 and 414, and are illustrated in dashed outline in the figure.

In step 408, which is reached from step 404 in processing write requests directed to the high-dedupe volume in the first write flow utilizing content-based signatures, a determination is made as to whether or not a write cache destage point has been reached. If the write cache destage point has been reached, the process moves to step 410, and otherwise returns to step 400 as indicated.

In step 410, a first type of destage process associated with the first write flow is executed in the distributed storage system. The process then returns to step 400 as indicated, but as mentioned previously, the processing of write requests illustratively continues without interruption, with the first type of destage process being performed in the background of the write request processing.

In step 412, which is reached from step 406 in processing write requests directed to the low-dedupe volume in the second write flow utilizing artificial signatures, a determination is made as to whether or not a write cache destage point has been reached. If the write cache destage point has been reached, the process moves to step 414, and otherwise returns to step 400 as indicated.

In step 414, a second type of destage process associated with the second write flow is executed in the distributed storage system. The process then returns to step 400 as indicated, but as mentioned previously, the processing of write requests illustratively continues without interruption, with the second type of destage process being performed in the background of the write request processing.

Similar operations may be performed on each of one or more additional storage nodes of the distributed storage system.

The steps are shown in sequential order for clarity and simplicity of illustration only, and certain steps can at least partially overlap with other steps.

Figure 5:
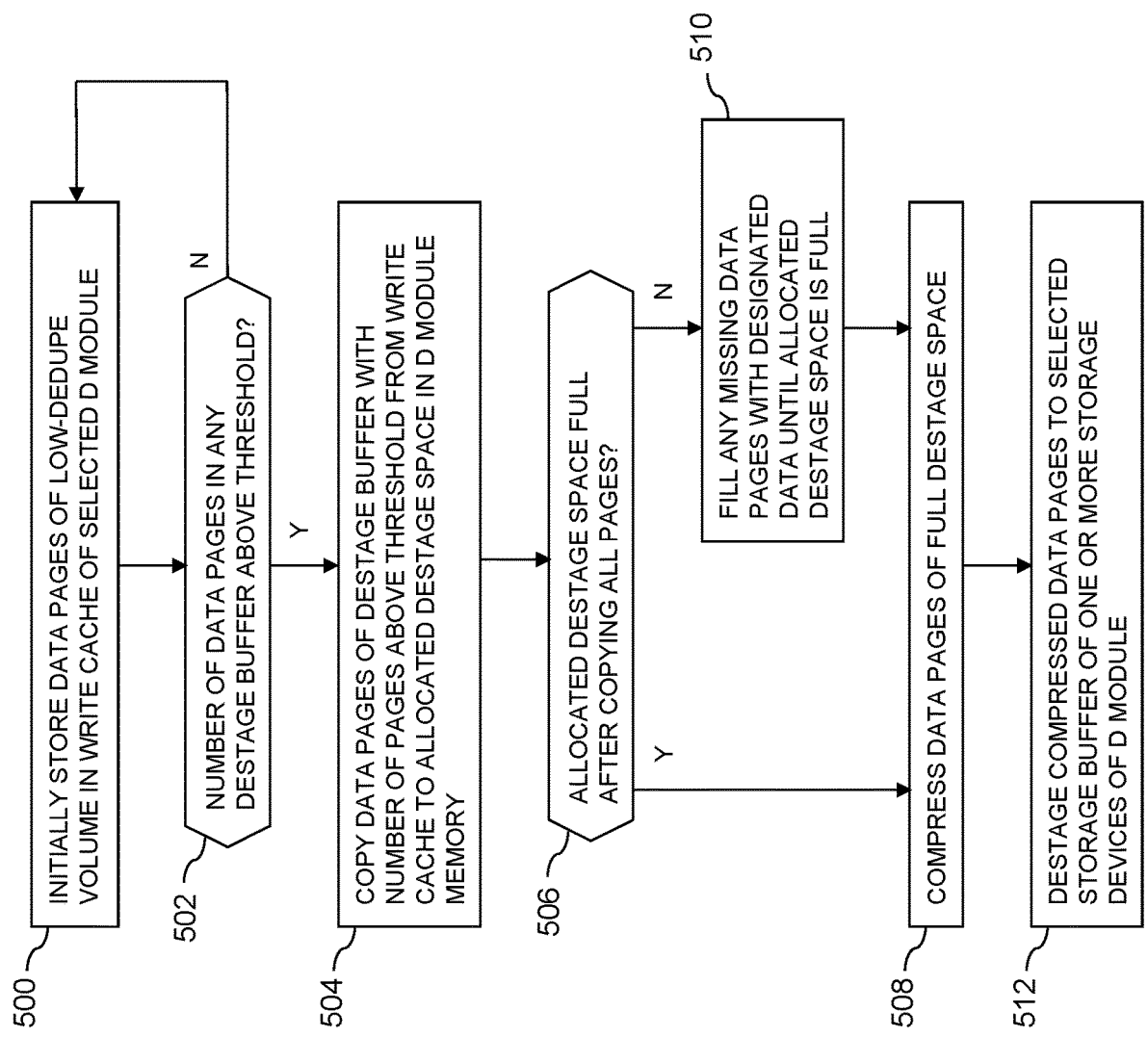
FIG. 5 is a flow diagram of an example destage process performed in conjunction with a write flow utilizing non-content-based signatures to provide sequential storage of data pages of a low-dedupe volume in an illustrative embodiment.

Referring now to FIG. 5, an example destage process performed in conjunction with the above-noted second write flow utilizing artificial signatures or other types of non-content-based signatures to provide sequential storage of data pages of a low-dedupe volume is shown. This process generally corresponds to an example of the second type of destage process referred to in step 414 of the FIG. 4 selective deduplication process. The first type of destage process referred to in step 410 of FIG. 4 in some embodiments is illustratively implemented using destaging functionality of a CAS system that stores deduplicated data utilizing content-based signatures, as in an otherwise conventional XtremIO™ storage array from Dell EMC. Such a process generally includes initially storing data pages of write requests in a write cache with backup to a persistent write cache journal, with subsequent destaging to back-end storage devices.

The FIG. 5 destaging process performed in conjunction with the second write flow includes steps 500 through 512, and is illustratively performed by storage nodes 102 or 202 of a distributed storage system. This example process generally involves destaging data pages of a low-dedupe volume from a write cache of a selected data module into at least one of a plurality of storage devices associated with that data module.

In step 500, data pages of the low-dedupe volume are initially stored in the write cache of the selected data module, illustratively with an identifier of the storage volume and a logical address of the data page within the storage volume.

In step 502, a determination is made as to whether or not the number of data pages in a destage buffer is above a threshold. The destage buffer illustratively comprises a portion or "chunk" of a sub-LUN representing a part of the storage volume. The determination of step 502 illustratively involves comparing a number of data pages in a destage buffer to a designated threshold, where the threshold in some embodiments varies dynamically as a function of an amount of memory space available in the write cache. For example, the threshold can be increased when there is a relatively high amount of memory space available in the write cache, and decreased when there is a relatively low amount of memory space available in the write cache. A fixed threshold can be used in other embodiments. Responsive to the determination of step 502 indicating that the number of data pages in a destage buffer is above the threshold, the process moves to step 504, and otherwise returns to step 500.

In step 504, all data pages that are part of the destage buffer are copied from the write cache to an allocated destage space in a memory of the data module.

In step 506, a determination is made as to whether or not the allocated destage space is full after the copying of all data pages that are part of the destage buffer. If the allocated destage space is full, the process moves directly to step 508 as shown, and otherwise moves to step 510 before reaching step 508.

In step 508, the data pages of the full destage space are compressed, using a designated compression algorithm. Any of a wide variety of well-known compression algorithms may be used.

In step 510, which is performed prior to reaching step 508 if the copying of data pages of the destage buffer in step 504 does not completely fill the allocated destage space, any missing data pages are filled with designated data until the allocated destage space is full, at which point the compression of step 508 is performed.

In step 512, the compressed data pages are destaged to a selected storage buffer of the storage devices associated with the data module. For example, destaging the compressed data pages to a selected buffer of the storage devices associated with the data module in some embodiments more particularly comprises dividing a storage space of the storage devices associated with the data module into multiple storage pools having respective different buffer sizes, selecting from a corresponding one of the storage pools a buffer having the smallest available buffer size that can accommodate the compressed data pages, and storing the compressed data pages utilizing the selected buffer in accordance with a redundant array of independent disks (RAID) storage arrangement.

The particular processing operations and other system functionality described in conjunction with the flow diagrams of FIGS. 4 and 5 are presented by way of illustrative example only, and should not be construed as limiting the scope of the disclosure in any way. Alternative embodiments can use other types of processing operations for selective deduplication in a distributed storage system. For example, as indicated above, the ordering of the process steps may be varied in other embodiments, or certain steps may be performed at least in part concurrently with one another rather than serially. Also, one or more of the process steps may be repeated periodically, or multiple instances of the processes can be performed in parallel with one another in order to implement a plurality of different selective deduplication processes for respective different distributed storage systems or portions thereof within a given information processing system.

Functionality such as that described in conjunction with the flow diagrams of FIGS. 4 and 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A distributed storage controller as disclosed herein is illustratively configured to implement functionality for selective deduplication, such as an algorithm comprising a process of the type shown in FIG. 4 or FIG. 5. Such a distributed storage controller can comprise, for example, storage controllers 108-1 and 108-2 of FIG. 1 or distributed storage controller 208 in CAS system 205, as configured to perform the steps of the process of FIG. 4 or FIG. 5.

A distributed storage controller can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, distributed storage controllers and other system components may be implemented at least in part using processing devices of such processing platforms. For example, respective distributed modules of a distributed storage controller can be implemented in respective containers running on respective ones of the processing devices of a processing platform.

More detailed examples of selective deduplication of the type described in conjunction with the processes of FIGS. 4 and 5 will now be described with reference to Algorithms A through E below. As in other description herein, references below to a "disk" or "disks" in the examples to be described are intended to refer generally to storage devices, including SSDs, and should therefore not be viewed as limited in any way to spinning magnetic media, or any other particular type of storage media.

As indicated previously herein, in some CAS systems, all storage volumes are subject to deduplication. The back-end storage devices store data pages by their hash signatures, and are oblivious to logical volume structure and addresses. While this is optimal for saving storage space, it has costs in terms of sequential IO performance. Consider a storage volume, such as a database transaction log volume or a file system storing compressed image files. These types of volumes will have nearly no deduplication potential at all. A user will typically perform sequential IOs against these storage volumes, for example, reading a 1 MB file means reading hundreds of data pages. In a CAS system of the type described above, this would mean hundreds of IO instances to the back-end storage devices. For storage volumes with relatively low deduplication potential, also referred to herein as "low-dedupe" volumes, it would be more beneficial to allow sequential storage of the data pages of such storage volumes. At the same time, it is desirable to allow maximal deduplication for data pages of storage volumes with relatively high deduplication potential, also referred to herein as "high-dedupe" volumes.

As described above, illustrative embodiments herein provide a distributed storage system that can efficiently support multiple distinct types of storage volumes through what is referred to herein as "selective deduplication." For example, such embodiments can selectively apply deduplication write flows and other related processes only to those write requests directed to high-dedupe volumes, while using non-deduplication write flows and other related processes for those write requests directed to low-dedupe volumes.

It is assumed for the following description of illustrative embodiments that the page size is 16 KB and storage volumes are broken into 4 MB segments of 256 pages each, with such segments also being referred to herein as sub-LUNs. Other values for page and segment sizes can be used in other embodiments.

In some embodiments, it is further assumed that the distributed storage system comprises R modules, C module and D modules, as described elsewhere herein. In the context of the example algorithms to be described below, the following additional assumptions are made. The R modules connect to host devices and respond to IO requests received from those host devices. The C modules maintain A2H tables, storing address to hash entries as well as "dirty"

bitmaps that mark which pages were written. The D modules persist data addressed by hash, that is, can fetch a page based on its hash, or store a page and return its hash. When a page is referenced multiple times, a reference count ("refcount") signifies how many times it is referenced in the system. For simplicity, the following description will not make a distinction between short hash and long hash, also referred to herein as hash handle and hash digest, respectively, but will instead refer generally to "hash."

The responsibility for the entire logical address space is illustratively divided among the C modules by dividing all possible sub-LUNs among them. In some embodiments, this is done by utilizing bits 8-17 of the logical address, counting from a least significant bit (LSB), to create a slice number in the range of 0 to 1023. The 1024 slices are evenly divided among all available C modules. Since bits 0-7 are not part of the slice number, each contiguous set of 256 pages (4 MB) belongs to the same sub-LUN and is thus part of the same slice handled by the same C module. A wide variety of other slice configurations can be used in other embodiments.

Illustrative embodiments herein extend this address ownership model to D modules as well, as will be described in more detail below.

An example of a first write flow for use with storage volumes having a relatively high deduplicability ("high-dedupe volumes") is as follows:

Algorithm A: Write Flow for High-Dedupe Volumes

1. R module receives a write request of one or more pages of data, a volume ID, and a logical address in the volume. For simplicity, a single page write is assumed, but the techniques can be readily extended to multiple page writes.

2. R module computes the hash signature of the data page, as well as the slice associated with the logical address.

3. R module selects a C module based on the slice number.

4. R module sends IO request to the selected C module.

5. C module selects a D module based on the hash signature.

6. C module asks selected D module to persist the data page. If the hash already exists, D module will just increase the hash's reference count without allocating more storage space; otherwise, it gets the data page from R module and persists it. Persisting data includes saving it in D module write cache and saving a second copy in an independent journal. At a later point in time, data is destaged to disk and removed from D module memory.

7. C module updates A2H mapping with the address and hash signature. If there was an old hash at the address, the new write is considered an overwrite.

8. In case of an overwrite, C module instructs D module which owns the old hash to decrement the reference count ("decref") for the old hash. If D module determines this is the last reference to the old hash, it can remove that hash and the page it represents from storage.

9. Write is complete.

Data destage in D module uses locations on disk that are independent of the volume layout. For example, an extent of storage space can contain pages from different volumes and arbitrary addresses, saved with their RAID parity information.

Illustrative embodiments herein utilize different techniques for storage volumes having a relatively low deduplicability ("low-dedupe volumes").

For at least one storage volume that the system identifies as a volume with a low dedupe probability, possibly via user configuration, through learning from previous deduplication patterns, or by other techniques, it uses a different write flow based on a different algorithm. For this algorithm, the 1024 slices are evenly divided among all available D modules, illustratively based on their address, using what are referred to herein as non-content-based signatures, or "artificial signatures." An artificial signature is also referred to in the context of the present examples as an "artificial hash," although it is to be appreciated that other types of artificial signatures can be used in other embodiments.

An example of a second write flow for use with storage volumes having a relatively low deduplicability ("low-dedupe volumes") is as follows:

Algorithm B: Write Flow for Low-Dedupe Volumes

1. R module receives a write request of one or more pages of data, a volume ID, and a logical address in the volume. As before, for simplicity, a single page write is assumed, but the techniques can be readily extended to multiple page writes.

2. R module computes the slice associated with the logical address.

3. R module selects a C module based on the slice number.

4. R module sends IO request to the selected C module.

5. C module creates an artificial hash that contains the volume ID and the offset. This artificial hash is not based on the content of the data page, but is unique for each page in the possible space of all pages on the storage system. For example, the artificial hash can be the volume's unique World-Wide Name (WWN) appended by the page address.

6. C module selects a D module based on the artificial hash or slice number, and asks it to persist the page.

7. D module persists the page by saving it in its write cache and saving a second copy in an independent journal. At a later point in time, data is aggregated and destaged to disk and removed from D module memory, illustratively using Algorithm C below.

8. C module updates the A2H table with an indication that the page is written (no need to store the hash digest since it can be calculated from the volume ID and the address). In some embodiments, this means that a "dirty" tree is updated, while the hash tree is never used in a low-dedupe volume, saving significant memory space.

9. Write is complete.

D module changes its algorithm for destaging pages with artificial hash. While pages with a real hash can be stored anywhere, D module stores pages of a low-dedupe volume (i.e., those coming with the artificial hash) sequentially inside a sub-LUN. In one embodiment, data in a sub-LUN is stored together, even if some of the pages have never been written.

This is illustratively done using the following example destaging algorithm for low-dedupe volumes:

Algorithm C: Destage to Disk for Low-Dedupe Volumes

1. New pages with artificial hash are persisted in D module write cache, along with their volume ID and address.

2. Sub-LUNs are divided if necessary into smaller contiguous buffers. For example, if the sub-LUN is 4 MB, it may be advantageous to divide it into 8 chunks of 512 KB. These smaller chunks are referred to herein as "destage buffers." The chunk size balances between the following conflicting needs:

(a) The chunks need to be big enough in order to write efficiently to the back-end, and gain better compression.

(b) The chunks need to be small enough so that write amplification is not too high. In other words, the penalty for rewriting a buffer is related to the buffer size, and a single page write should not force re-read, re-compress and re-write of an entire 4 MB sub-LUN.

3. When the number of cached pages in a destage buffer exceeds a threshold, D module may decide to destage these pages to disk in order to save memory. The threshold can be dynamic. For example, it can be lower when write cache memory is tight and higher when write cache memory is plentiful.

4. Destaging pages from a destage buffer of 512 KB involves the following steps:

(a) Allocate 512 KB of memory space, called destage space.

(b) Copy all pages belonging to the destage buffer from the D module write cache to the destage space.

(c) If the destage space is not full, read from disk any old pages that are not in the destage space (i.e., fill the "holes" with old data).

(d) Zero any remaining pages (these pages were never written and therefore are considered to be zero).

(e) Compress the entire destage space as a single buffer.

(f) Select from disk an appropriately sized buffer to store the data, illustratively using Algorithm D below.

(g) Remove old destage buffer copy from disk.

In Algorithm C above, there are variable-size chunks that need to be destaged to disk. The size of data is the result of compressing a 512 KB destage buffer, and can be anywhere between a few hundred bytes and the full 512 KB. In illustrative embodiments, this data is stored efficiently and with RAID protection. A compression metadata header could be attached to the compressed data buffer to indicate size of buffer needed to decompress.

The following is an example algorithm for use in the destaging of variable-size chunks to disk.

Algorithm D: RAID Disk Layout for Destaged Data

1. Back-end is divided into multiple pools, where each pool stores data of different sizes. For example, there can be pools for 64 KB, 128 KB, 256 KB, 378 KB and 512 KB buffer sizes.

2. When a 512 KB destage buffer needs to be stored, it is compressed and its compressed size is examined. The pool that will store the compressed buffer most efficiently is selected, i.e., the pool with buffer size just big enough to contain the compressed buffer. For example, if the compressed size is 200 KB, the 256 KB, 378 KB or 512 KB pools can each accommodate the compressed buffer, and so the smallest of these is selected, namely, the 256 KB pool.

3. The back-end stores the destaged buffer in one of several ways:

(a) RAID-1: store two copies of the data.

(b) RAID-5/6: divide buffer into multiple smaller chunks, add RAID parity, and stripe across multiple disks.

(c) RAID-5/6 alternative: store buffer with other write-pending buffers in the pool by adding additional parity buffers. For example, if there are 10 buffers of 256 KB ready to be destaged and a 10+2 scheme is being used, compute two additional parity buffers of 256 KB and store the 12 buffers on 12 different disks.

(d) Any other RAID scheme, such as Reed-Solomon codes or other types of error correcting codes, can be used.

The following is an example algorithm for reading data from low-dedupe volumes stored in the manner described above.

Algorithm E: Read Flow for Low-Dedupe Volumes

1. R module receives a read request for one or more data pages, including a volume ID, and a logical address in the volume. Again, a single page read is described for simplicity, without limitation.

2. R module computes the slice associated with the logical address.

3. R module selects a C module based on the slice number.

4. R module sends IO request to the selected C module.

5. C module checks A2H mapping data, and gets the artificial hash.

6. C module selects a D module based on the artificial hash (or slice number), then asks it to read data.

7. D module checks if the page is in cache. If so, it returns it to C module and the operation is complete.

8. Otherwise, D module locates the page by artificial cache, reads the page metadata, allocates a decompress buffer, decompresses the data, and reads the corresponding data portion from the decompressed data buffer. Typically, the read request is smaller than the uncompressed buffer. The rest of the buffer may be cached in D module.

9. D module sends the requested data to C module.

10. Read is complete.

It is to be appreciated that the particular example algorithms described above are presented by way of illustration only, and should not be construed as limiting in any way. Additional or alternative steps can be used, and the ordering of the steps can vary in other embodiments, possibly with each of one or more steps being performed at least in part in parallel with one or more other steps.

In the above-described illustrative embodiments, the D module access becomes sequential for low-dedupe volumes, such that with a single destage-buffer read the D module can bring a contiguous 512 KB of data to its cache. Compression is improved, as the entire 512 KB can be compressed. Moreover, there is no need to waste CPU and memory on hash signatures for low-dedupe volumes. Write amplification and the read-modify-write penalty can be minimized by choosing a smaller buffer size.

These and other embodiments disclosed herein provide significant advantages over approaches that require deduplication for all storage volumes, as only a single instance of data is addressable via hash signature. As indicated previously, sequential IOs are effectively treated as random IOs in such approaches due to randomization of hash signatures, and all data blocks have to have their hash signatures computed for addressing purposes, even if those blocks have very low potential deduplicability.

Illustrative embodiments of a distributed storage system with functionality for selective deduplication as disclosed herein can therefore provide a number of significant advantages relative to conventional arrangements.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed storage systems with functionality for selective deduplication will now be described in greater detail with reference to FIGS. 6 and 7. Although described in the context of system 100, these platforms may also be used to implement at least portions of other information processing systems in other embodiments.

Figure 6:
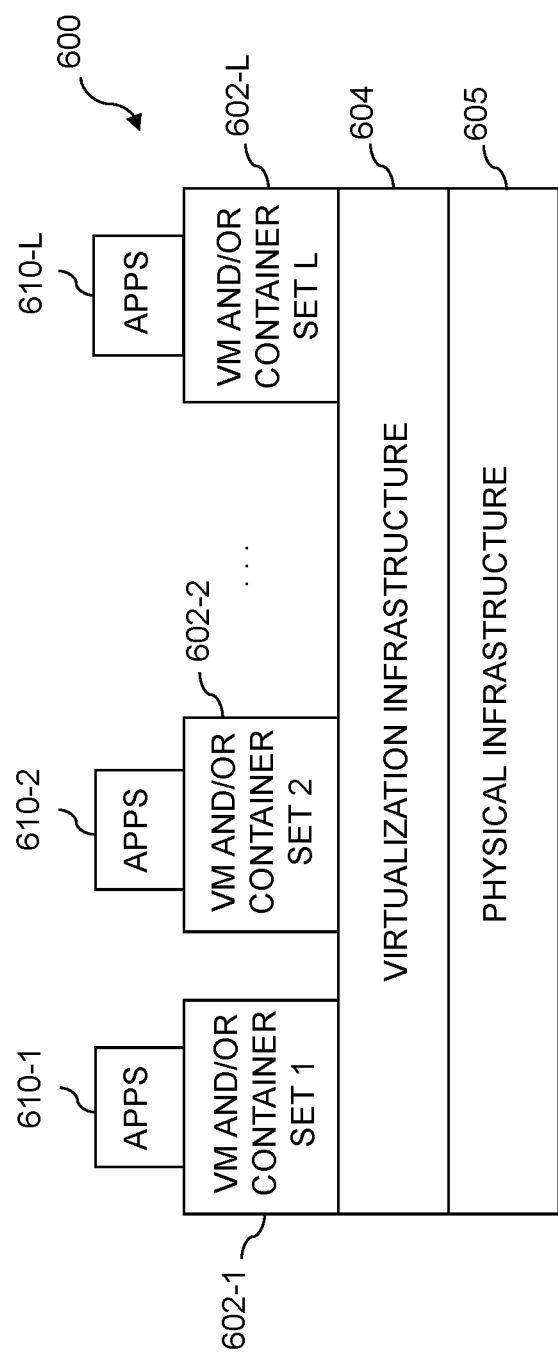
FIGS. 6 and 7 show examples of processing platforms that may be utilized to implement at least a portion of an information processing system in illustrative embodiments.
Figure 7:
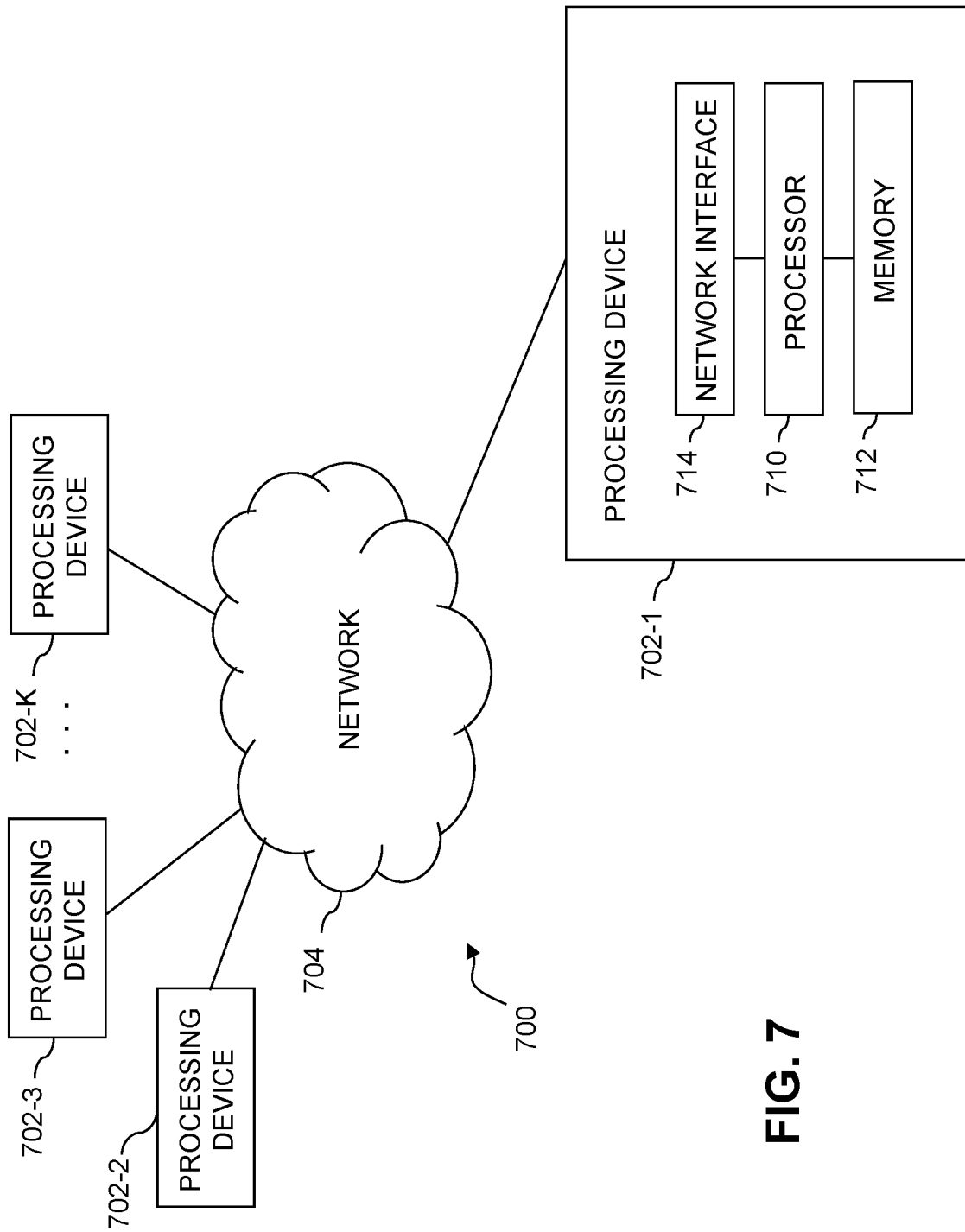

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for selective deduplication in a distributed storage system of the type described above using one or more processes running on a given one of the VMs. For example, each of the VMs can implement logic instances and/or other components for implementing functionality for selective deduplication in the CAS system 205.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide functionality for selective deduplication in a distributed storage system of the type described above. For example, a container host device supporting multiple containers of one or more container sets can implement logic instances and/or other components for implementing functionality for selective deduplication in the CAS system 205.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for selective deduplication provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, local and remote interfaces, deduplication logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   for each of a plurality of storage volumes of a distributed storage system:
   to determine whether the storage volume has a first potential deduplicability or a second potential deduplicability, wherein the first potential deduplicability is greater than the second potential deduplicability;
   responsive to determining that the storage volume has the first potential deduplicability, to execute a first write flow in the distributed storage system for each of a plurality of write requests directed to the storage volume, the first write flow utilizing content-based signatures of respective data pages of the storage volume to store the data pages in storage devices of the distributed storage system; and
   responsive to determining that the storage volume has the second potential deduplicability, to execute a second write flow in the distributed storage system for each of a plurality of write requests directed to the storage volume, the second write flow utilizing non-content-based signatures of respective data pages of the storage volume to store the data pages in storage devices of the distributed storage system;
   wherein potential deduplicability of the storage volume is expressed at least in part as an estimated deduplication ratio.

2. The apparatus of claim 1 wherein determining whether the storage volume has a first potential deduplicability or a second potential deduplicability comprises:
   obtaining a deduplicability indicator previously established for the storage volume; and
   making the determination based at least in part on the obtained deduplicability indicator.

3. The apparatus of claim 1 wherein determining whether the storage volume has a first potential deduplicability or a second potential deduplicability comprises:
   generating a deduplication estimate for the storage volume; and
   making the determination based at least in part on comparison of the deduplication estimate for the storage volume to a threshold deduplication level.

4. The apparatus of claim 1 wherein each of at least a subset of a plurality of storage nodes of the distributed storage system comprises a set of processing modules configured to communicate with corresponding sets of processing modules on other ones of the storage nodes, a given such set of processing modules comprising at least a routing module, a control module and a data module, the sets of processing modules of the storage nodes of the distributed storage system collectively comprising at least a portion of a distributed storage controller of the distributed storage system.

5. The apparatus of claim 4 wherein the first write flow for each of one or more of the write requests directed to the storage volume comprises:
   receiving the write request in one of the routing modules;
   computing in the routing module a content-based signature for a data page of the write request;
   selecting in the routing module a particular one of the control modules based at least in part on a logical address of the data page;
   sending the write request and the content-based signature from the routing module to the selected control module;
   selecting in the control module a particular one of the data modules based at least in part on the content-based signature; and
   sending the data page from the control module to the selected data module for storage of the data page based at least in part on the content-based signature.

6. The apparatus of claim 4 wherein the second write flow for each of one or more of the write requests directed to the storage volume comprises:
   receiving the write request in one of the routing modules;
   selecting in the routing module a particular one of the control modules based at least in part on a logical address of the data page;
   sending the write request from the routing module to the selected control module;
   generating in the control module a non-content-based signature for a data page of the write request;
   selecting in the control module a particular one of the data modules based at least in part on the non-content-based signature; and
   sending the data page from the control module to the selected data module for storage of the data page based at least in part on the non-content-based signature.

7. The apparatus of claim 6 wherein the non-content-based signature is generated for the data page based at least in part on an identifier of the storage volume and an offset of the data page within the storage volume.

8. The apparatus of claim 6 wherein the non-content-based signature comprises a combination of an identifier of the storage volume and a logical address of the data page within the storage volume.

9. The apparatus of claim 6 wherein the non-content-based signature uniquely identifies the data page among all other data pages of the distributed storage system.

10. The apparatus of claim 6 wherein storing the data page based at least in part on the non-content-based signature comprises:
    initially storing the data page in a write cache of the selected data module with an identifier of the storage volume and a logical address of the data page within the storage volume; and
    subsequently destaging the data page from the write cache of the data module into at least one of a plurality of storage devices associated with that data module;
    wherein destaging the data page from the write cache comprises:
    comparing a number of data pages in a destage buffer to a threshold;
    responsive to the number of data pages in the destage buffer exceeding the threshold, copying all data pages that are part of the destage buffer from the write cache to an allocated destage space in a memory of the data module;
    responsive to the destage space not being full after the copying of all data pages that are part of the destage buffer, filling any missing data pages with designated data until the destage space is full;
    compressing the data pages of the full destage space; and
    destaging the compressed data pages to a selected storage buffer of the storage devices associated with the data module.

11. The apparatus of claim 10 wherein the threshold varies dynamically as a function of an amount of memory space available in the write cache.

12. The apparatus of claim 10 wherein destaging the compressed data pages to a selected buffer of the storage devices associated with the data module comprises:
dividing a storage space of the storage devices associated with the data module into multiple storage pools having respective different buffer sizes;
selecting from a corresponding one of the storage pools a buffer having the smallest available buffer size that can accommodate the compressed data pages; and
storing the compressed data pages utilising the selected buffer in accordance with a redundant array of independent disks (RAID) storage arrangement.

13. The apparatus of claim 6 wherein reading the data page from a plurality of storage devices associated with the selected data module comprises:
receiving a read request in one of the routing modules, the read request comprising an identifier of the storage volume and a logical address of the data page within the storage volume;
selecting in the routing module a particular one of the control modules based at least in part on a logical address of the data page;
sending the read request from the routing module to the selected control module;
obtaining in the control module the non-content-based signature for the data page;
selecting in the control module a particular one of the data modules based at least in part on the non-content-based signature; and
sending from the control module to the selected data module a request for retrieval of the data page based at least in part on the non-content-based signature.

14. A computer program product comprising a non-transitory processor-readable storage medium having stored therein program code of one or more software programs, wherein the program code when executed by at least one processing device causes said at least one processing device:
for each of a plurality of storage volumes of a distributed storage system:
to determine whether the storage volume has a first potential deduplicability or a second potential deduplicability, wherein the first potential deduplicability is greater than the second potential deduplicability;
responsive to determining that the storage volume has the first potential deduplicability, to execute a first write flow in the distributed storage system for each of a plurality of write requests directed to the storage volume, the first write flow utilising content-based signatures of respective data pages of the storage volume to store the data pages in storage devices of the distributed storage system; and
responsive to determining that the storage volume has the second potential deduplicability, to execute a second write flow in the distributed storage system for each of a plurality of write requests directed to the storage volume, the second write flow utilizing non-content-based signatures of respective data pages of the storage volume to store the data pages in storage devices of the distributed storage system;
wherein potential deduplicability of the storage volume is expressed at least in part as an estimated deduplication ratio.

15. The computer program product of claim 14 wherein each of at least a subset of a plurality of storage nodes of the distributed storage system comprises a set of processing modules configured to communicate with corresponding sets of processing modules on other ones of the storage nodes, a given such set of processing modules comprising at least a routing module, a control module and a data module, the sets of processing modules of the storage nodes of the distributed storage system collectively comprising at least a portion of a distributed storage controller of the distributed storage system.

16. The computer program product of claim 15 wherein the second write flow for each of one or more of the write requests directed to the storage volume comprises:
receiving the write request in one of the routing modules;
selecting in the routing module a particular one of the control modules based at least in part on a logical address of the data page;
sending the write request from the routing module to the selected control module;
generating in the control module a non-content-based signature for a data page of the write request;
selecting in the control module a particular one of the data modules based at least in part on the non-content-based signature; and
sending the data page from the control module to the selected data module for storage of the data page based at least in part on the non-content-based signature.

17. A method comprising:
for each of a plurality of storage volumes of a distributed storage system:
determining whether the storage volume has a first potential deduplicability or a second potential deduplicability, wherein the first potential deduplicability is greater than the second potential deduplicability;
responsive to determining that the storage volume has the first potential deduplicability, executing a first write flow in the distributed storage system for each of a plurality of write requests directed to the storage volume, the first write flow utilising content-based signatures of respective data pages of the storage volume to store the data pages in storage devices of the distributed storage system; and
responsive to determining that the storage volume has the second potential deduplicability, executing a second write flow in the distributed storage system for each of a plurality of write requests directed to the storage volume, the second write flow utilising non-content-based signatures of respective data pages of the storage volume to store the data pages in storage devices of the distributed storage system;
wherein the plurality of storage volumes comprises at least a first storage volume having the first potential deduplicability and at least a second storage volume having the second potential deduplicability;
wherein potential deduplicability of the storage volume is expressed at least in part as an estimated deduplication ratio; and
wherein the method is performed by at least one processing device comprising a processor coupled to a memory.

18. The method of claim 17 wherein each of at least a subset of a plurality of storage nodes of the distributed storage system comprises a set of processing modules configured to communicate with corresponding sets of processing modules on other ones of the storage nodes, a given such set of processing modules comprising at least a routing module, a control module and a data module, the sets of processing modules of the storage nodes of the distributed storage system collectively comprising at least a portion of a distributed storage controller of the distributed storage system.

19. The method of claim 18 wherein the second write flow for each of one or more of the write requests directed to the storage volume comprises:
   receiving the write request in one of the routing modules;
   selecting in the routing module a particular one of the control modules based at least in part on a logical address of the data page;
   sending the write request from the routing module to the selected control module;
   generating in the control module a non-content-based signature for a data page of the write request;
   selecting in the control module a particular one of the data modules based at least in part on the non-content-based signature; and
   sending the data page from the control module to the selected data module for storage of the data page based at least in part on the non-content-based signature.

20. The method of claim 18 wherein the first write flow for each of one or more of the write requests directed to the storage volume comprises:
   receiving the write request in one of the routing modules;
   computing in the routing module a content-based signature for a data page of the write request;
   selecting in the routing module a particular one of the control modules based at least in part on a logical address of the data page;
   sending the write request and the content-based signature from the routing module to the selected control module;
   selecting in the control module a particular one of the data modules based at least in part on the content-based signature; and
   sending the data page from the control module to the selected data module for storage of the data page based at least in part on the content-based signature.

* * * * *

UNITED STATES PATENT AND TRADEMARK OFFICE
CERTIFICATE OF CORRECTION

| | | |
|---|---|---|
| PATENT NO. | : 11,435,921 B2 | Page 1 of 1 |
| APPLICATION NO. | : 16/952639 | |
| DATED | : September 6, 2022 | |
| INVENTOR(S) | : David Meiri et al. | |

It is certified that error appears in the above-identified patent and that said Letters Patent is hereby corrected as shown below:

In the Claims

Claim 12, Column 37, Line 13, please delete "utilising" and insert therefor --utilizing--

Claim 14, Column 37, Line 51, please delete "utilising" and insert therefor --utilizing--

Claim 17, Column 38, Line 38, please delete "utilising" and insert therefor --utilizing--

Claim 17, Column 38, Line 46, please delete "utilising" and insert therefor --utilizing--

Signed and Sealed this
Twenty-fifth Day of October, 2022

Katherine Kelly Vidal
*Director of the United States Patent and Trademark Office*